May 21, 1963     J. E. LUDERER     3,090,317
FREE PISTON ENGINES

Filed June 10, 1960                                                                11 Sheets-Sheet 1

INVENTOR.
JOHN E. LUDERER
BY
ATTORNEY

INVENTOR.
JOHN E. LUDERER

INVENTOR.
JOHN E. LUDERER
BY Philip Subkow
ATTORNEY

INVENTOR.
JOHN E. LUDERER
BY
ATTORNEY

INVENTOR.
JOHN E. LUDERER
BY Philip Subkow
ATTORNEY

May 21, 1963 J. E. LUDERER 3,090,317
FREE PISTON ENGINES
Filed June 10, 1960 11 Sheets-Sheet 9
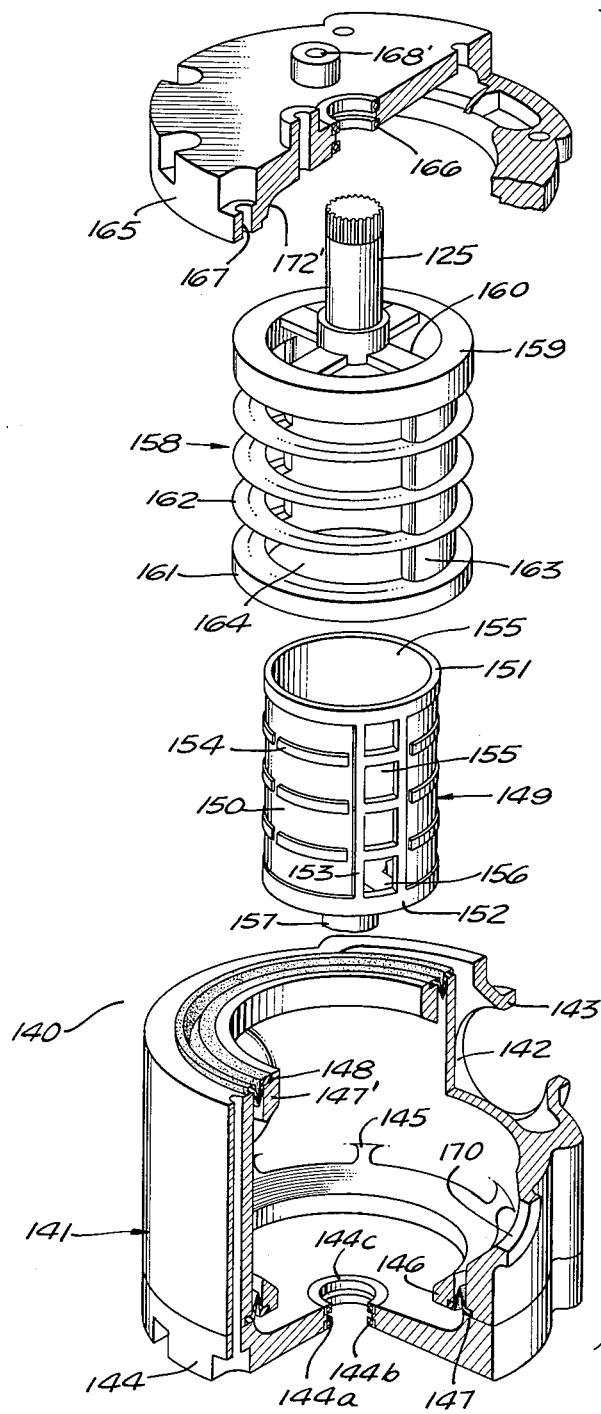
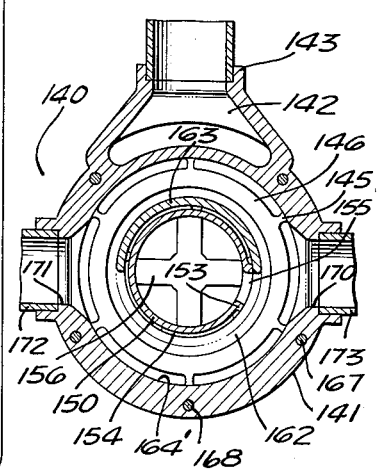
INVENTOR.
JOHN E. LUDERER
BY Philip Subkow
ATTORNEY

United States Patent Office 3,090,317
Patented May 21, 1963

3,090,317
FREE PISTON ENGINES
John E. Luderer, P.O. Box 432, Balboa Island, Calif.
Filed June 10, 1960, Ser. No. 35,176
19 Claims. (Cl. 103—54)

This invention relates to improvements in free piston engines and is also directed to the pumping of a fluid by free piston engines and the generation of power from the high pressure fluid so produced.

Free piston engines of the diesel type are well known, and the characteristics are now part of the know-how of the internal combustion engine art. They have, as far as the applicant knows, been used to generate power as a gasifier employing the high-temperature exhaust gases in gas turbines, and as air compressors by bleeding a compressor section of the free piston engine, or the free piston compressor may be employed with a second compressor section in addition to the scavenge air compressor to deliver high pressure gases.

It is an object of my invention to design a free piston engine of high-power-to-weight ratio and of high thermal efficiency, which is simple in design and operation, and flexible in operation without impairment of efficiency.

It is also an object of my invention to design an engine of the minimum volume for a given power output by a geometric design which utilizes a minimum of space for the various cylinders and compartments of the engine.

It is another object of my invention to design the geometry of the engine so that the total volume contained by the exterior envelope is minimized in comparison to the volume displaced by the pistons.

It is another object of my invention to design a free piston engine in which the starting air case is made an integral part of the engine with a minimum space utilization.

It is another object of my invention to design a free piston engine in which the scavenge case is so constructed as to be independent of the compressor cylinder and air case and is a separate structure whose volume may be selected independently of the compressor volume or other engine parameters.

It is a further object of my invention to design a free piston engine of symmetrical construction which may be assembled by a central flange and bolt arrangement and to thus minimize thermal strains in the engine.

It is a further object of my invention to design a free piston engine in which a starting air valve is employed in association with the starting air case in such manner that a minimum valve travel produces a maximum port area, to permit low starting air pressures and to occupy but a minimum fraction of the stroke for such purposes.

It is an object of my invention to design a starting air valve for a free piston engine such that, under the low pressures available in the starting air chamber, the valve travels to open a large port area in a time which is sufficiently small to develop the full starting bounce pressure in the bounce chamber before the piston has moved an appreciable distance or has attained an appreciable kinetic energy. Since the acceleration of the engine piston is a function of the starting air pressure available, this provides for large starting acceleration and minimizes the velocities involved in the starting function.

It is another object of my invention to design a free piston engine in which a bounce pressure control port is provided at a selected portion of the stroke, such port being designed that a minimum piston travel opens a maximum port area for such purpose.

It is a further object of my invention to design a free piston engine in which the force balance on the piston is controlled to maintain the forces in relation to each other, throughout the stroke, to permit the completion of the designed stroke.

It is a further object of my invention to design a free piston engine in which the load on the engine is controlled at that portion of the stroke where the load becomes excessive, to adjust the forces available to act on the piston, in order that the force balance on the piston be such as to permit the piston to complete its designed excursion.

It is a further object of my invention to design a free piston engine whereby the load on the piston is controlled so that it shall be reduced at a selected point in the stroke to a magnitude to permit the engine to complete its stroke.

It is a further object of my invention to control the force balance on the pistons in order to establish the maximum velocity of the piston at that portion of the stroke which would permit the completion of the designed stroke.

It is a further object of my invention to design a free piston engine in which the control rods of the engine are the means for pumping cooling and lubricating oil throughout the piston.

It is a further object of my invention to design an oil cooling system to permit a controlled and uniform passage of oil across the piston face for cooling the face thereof evenly.

It is a further object of my invention to design a fuel ring for a combustion engine, which may or may not include a free piston engine whereby the fuel may be injected as a sheet across the cross section of the engine.

It is a further object of my invention to employ a valve construction to permit the control of the valve port area for the introduction of compressed air into the scavenge case.

It is also an object of my invention to design a free piston engine which can be operated to pump and deliver fluids under pressure at the desired volume flow rate which may be varied without varying the output pressure, and may be matched to the demand on the pump.

It is also an object of my invention to obtain the desired hydraulic pressure, which may be varied within wide limits without stalling the engine.

It is also an object of my invention to deliver the desired fluid pressure and volume without impairing the stroke characteristics of the engine.

While I may incorporate all of the above objectives into a single design, such as the preferred embodiment described in this specification, these several objectives are also suitable separately as improvements in free piston engines. They may each be used as improvements in embodiments of the free piston engine principle without employing any or all of the other features referred to in the above objectives.

In the free piston engines operating as a compressor to deliver compressed air, a separate compressor cylinder is employed in addition to the scavenge air and the bounce cylinder. This reduces the space economy of the engines. I may, however, employ the space and weight economy of the free piston gasifier in constructing the free piston pump of my invention.

I, however, am able to further reduce the weight and volume of the engine by employing a pressurized liquid rather than the compressed gases as a means of obtaining work from the engine. This space and weight economy arises from the fact that the volume of liquid required to absorb the power output from the engine of my design is much less than the volume of gas required if the same amount of power is absorbed through the medium of a gaseous fluid as in the case of a free piston gasifier or compressor.

I incorporate a pump piston and cylinder into the free piston engine without substantially increasing the volume of the engine. For like power output, the volume of the engine of the prior art delivering power via compressed gases or hot exhaust gases is many times greater than where the power output is delivered by pumping liquids, by means of the engine of my invention.

However, the principles of my invention may also be applied to the pumping of gaseous fluids as in compressors, sacrificing some space economy arising from the character of the fluid pumped.

It is another object of my invention to develop the pressure in the pump cylinder on the outstroke of the piston. This reduces the required bounce pressure and/or bounce volume to a minimum. Unlike the conventional free piston gasifier, the bounce chamber in the free-piston pump of my invention is not required to develop the energy to provide the useful work output in the exhaust gases which in a gasifier must be under sufficient pressure to operate the gas turbine. The exhaust gases in my design may be exhausted to ambient pressure.

Unlike the prior art free-piston engines, the system of my invention creates a balance of forces, that at no time is the net force on the piston such that it cannot execute its full travel at the design frequency and independently of the back pressure on the fluid which performs the useful work output of the engine. In the engines of the prior art, if the outlet pressure from the exhaust or the compressor section is continually increased, the point is reached when the pressure on the engine cylinder will cause a stalling of the engine. This is one of the problems in the control of the free-piston gasifier-engine turbine combination, operating under a variable load. It is also a problem when the free piston engine delivers compressed gases for useful work. In my design this difficulty is avoided.

It is a further advantage of the system of my invention that the load on the engine is regulated so that at no time does it exceed the net work available through the entire stroke. Since this net work is the product of the net force times the stroke, when the net force available from the engine at any point in the piston stroke is insufficient to overcome the load imposed on the free-piston pump, the system of my invention reduces the pressure of the fluid pumped to impose that load which may be tolerated by the engine and permit the piston to execute its full stroke.

These and other objects of my invention will be understood by those skilled in the art from the following description taken together with the drawings.

FIG. 14 is a section taken on line 14—14 of FIG. 3.

FIG. 15 is an exploded view of the selector valve shown in section in FIGS. 3, 5 and 14, with parts broken away.

Figure 5:
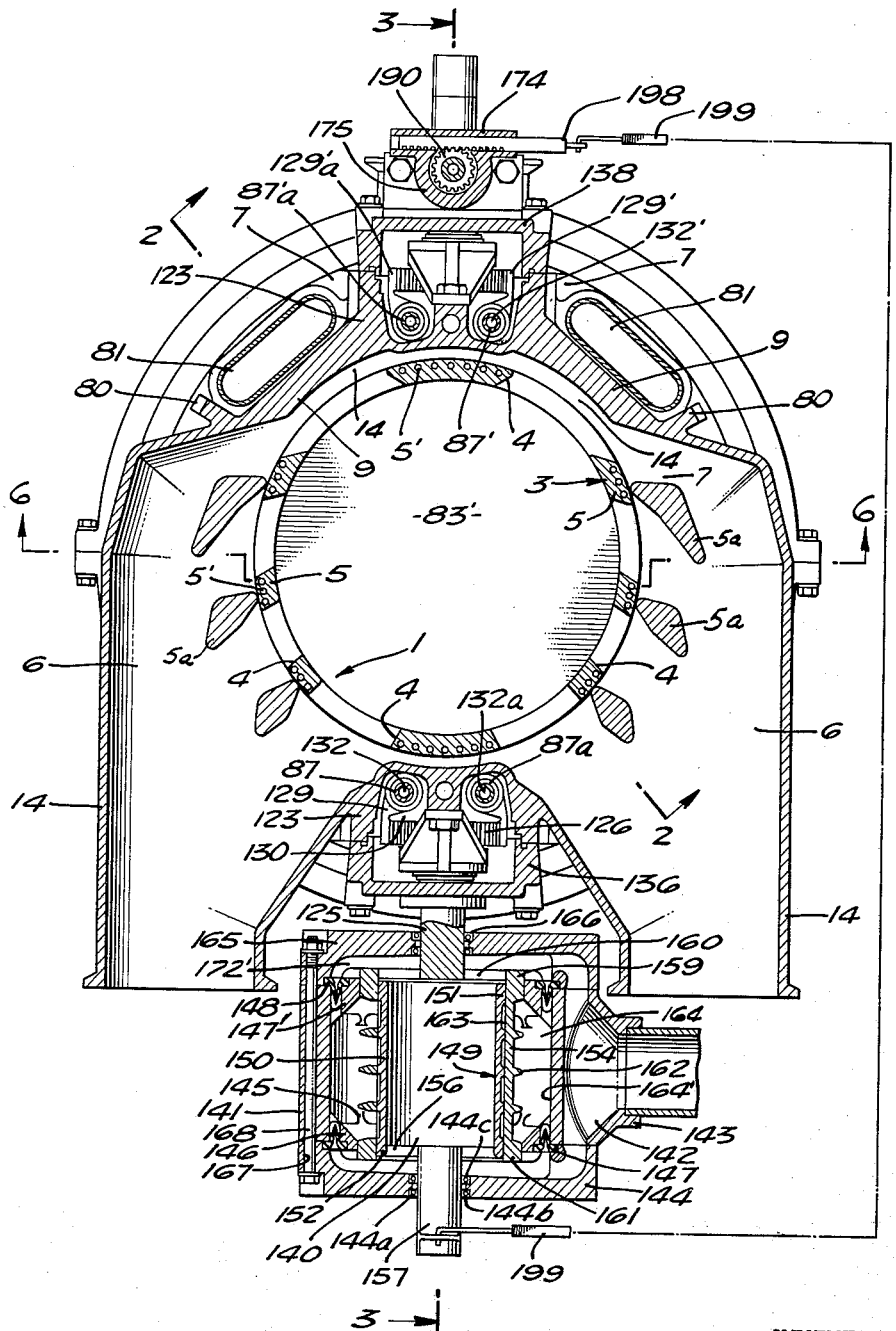
FIG. 5 is a section taken on line 5—5 of FIG. 3.
Figure 6:
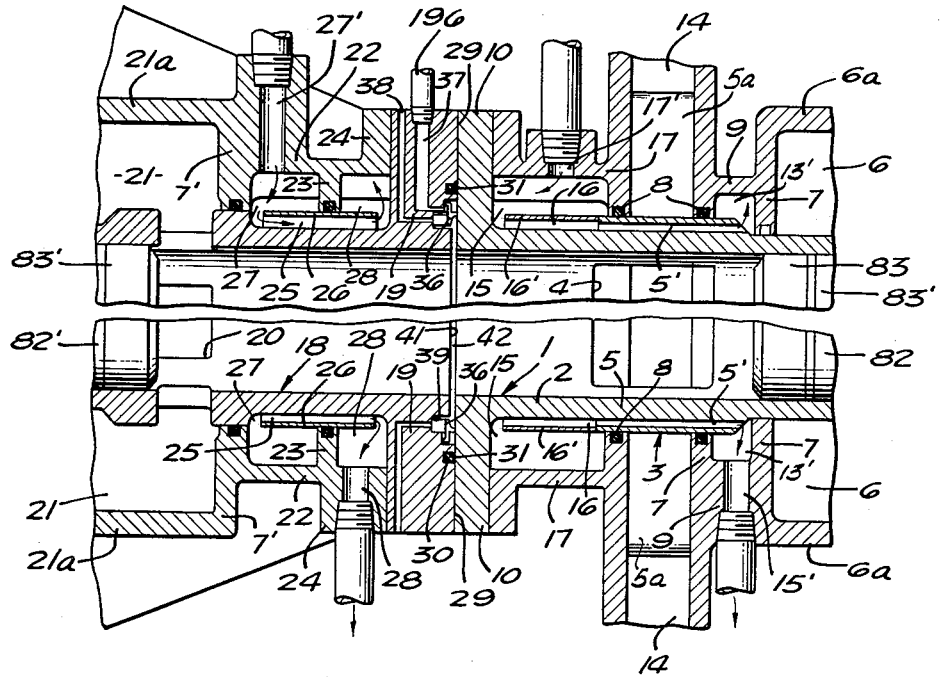
FIG. 6 is a fragmentary section with parts broken away taken on line 6—6 of FIG. 1.

The exhaust cylinder (see FIGS. 2 and 3) is formed of tubular section 1 (see FIGS. 2 and 5), and a flange section 2 has a thickened section 3 (see FIGS. 2, 3, 5 and 11) adjacent the flange which contains a series of circumferentially-positioned exhaust ports 4. The portions of the thickened section 3 between the exhaust ports 4 form bridges 5 (see FIGS. 2, 5 and 6). The thickened section 3 at the bridges 5 is bored at 5' (see FIGS. 3, 5 and 6). Positioned (see FIGS. 2, 3 and 6) exteriorly of the cylinder is the exhaust scavenge case 6. The exhaust scavenge case (see FIGS. 2, 3, 5, 6 and 11) has a dependent flange 7, which is sealed by seals 8 against the exterior surface of 1 and carries an irregular flange 9 and 17, having an upstanding flange section (see FIGS. 2, 3, 5 and 6), and an upstanding flange 10, which is to receive bolts 24' (FIG. 2) and decribed below. The flange 2 is forked at 123 (see FIG. 5) to be more fully described below. The flange 11 and the wall 12 are connected between 9 and 17 and form the exhaust passageway 14, which is sealed at 8 against the continuous exterior surface of 3 by suitable seals. Spaced about the engine cylinder (see FIG. 5) are a plurality of deflecting baffles 5a connected between the walls of the exhaust passageway 14 and positioned at the bridges 5.

Positioned within space 15 under flange section 17 (see FIGS. 2, 6 and 11) of exhaust cylinder section is a circumferential metal ring 16' (see FIGS. 6 and 11), positioned upon the rib 16 formed by grooving the thickened section 3. A water inlet 17' (see FIG. 6), to be more fully described below, is provided in the wall of flange section 17 on one side of the bridge 5. The corresponding outlet 15' is provided in the wall of the flange section 9 on the other side of the bridges 5. The water passes from the inlet connection to the outlet connection through the grooves 16 under the shield 16' and the bores 5' into the outlet 15'.

Figure 2:
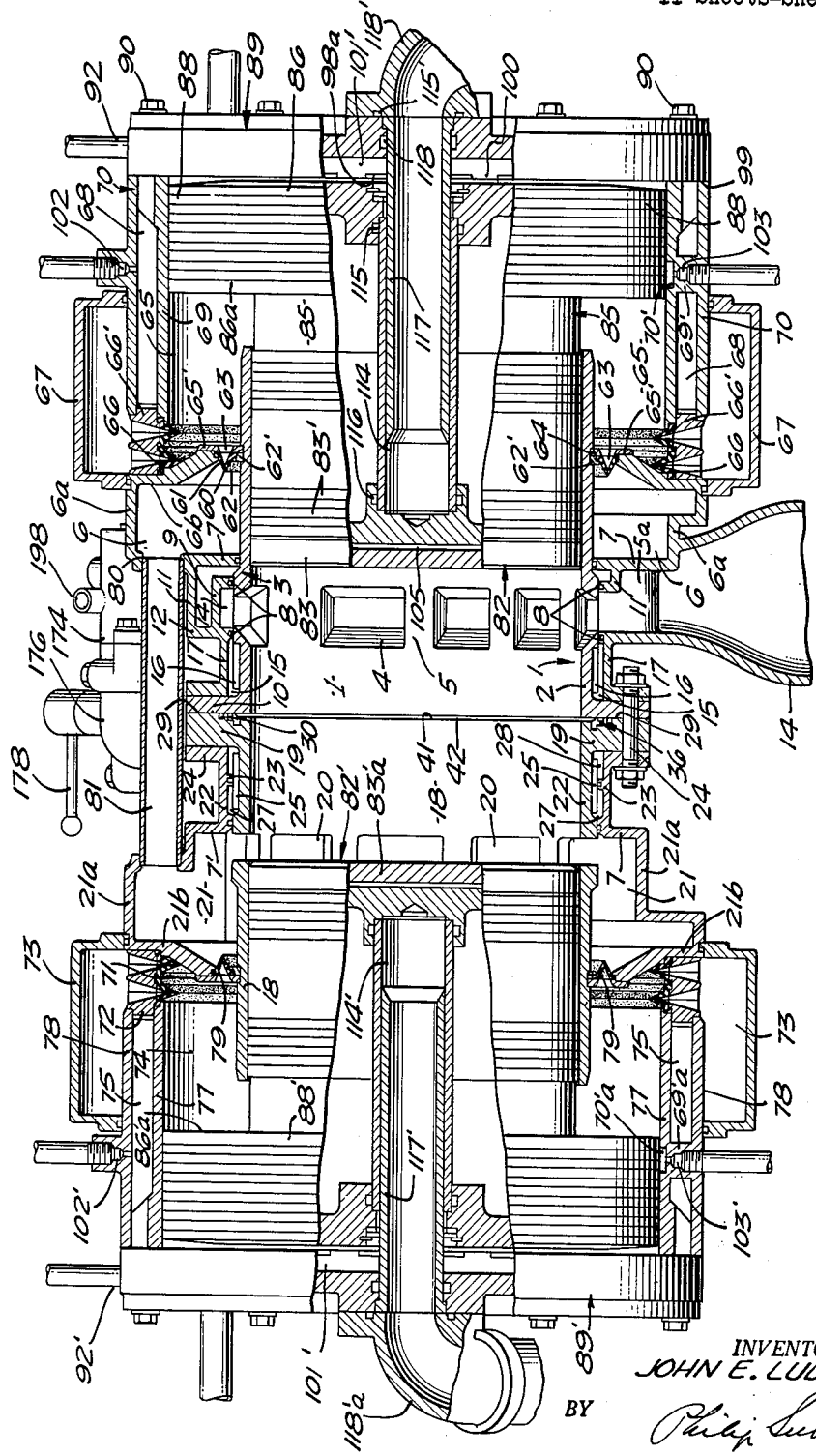
FIG. 2 is a section taken on line 2—2 of FIG. 5, partly in plan with parts broken away.
Figure 3:
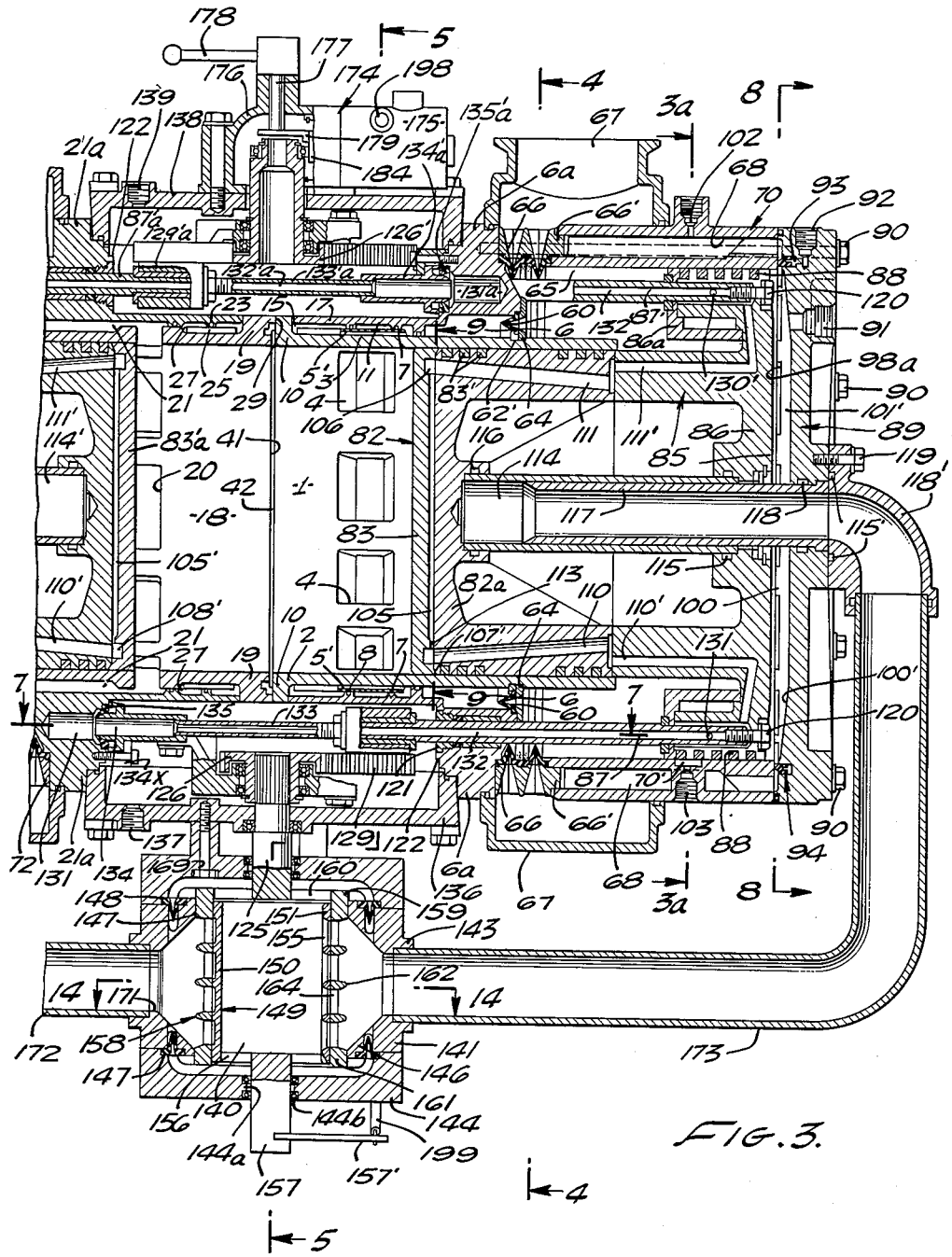
FIG. 3 is a partial section taken on line 3—3 of FIG. 5.

In FIGS. 2 and 3 the scavenge case 21a carries a wall 7' similar to 7. Both walls are similarly forked (see FIG. 5) for purposes to be described below. The exhaust scavenge case (see FIG. 2) formed by the wall 7, top 6a and wall 6b, and the cylinder 1, and the scavenge case 21 formed by top 21a, wall 7' and 21b, and the cylinder 18 of the scavenge cylinder section, are both scavenge air-cases, as will be more fully described below.

The scavenge cylinder section is formed of a tubular section 18 and upstanding flange section 19 (see FIGS. 2, 3 and 6) constructed similarly to the exhaust cylinder section 1, with the differences to be described below. In the tubular portions of the cylinder 18 are circumferentially-positioned scavenge air intake ports 20 (see FIGS. 2, 3, 6 and 11) through the wall of the tubular section. The scavenge case 21, formed of top 21a, wall 21b, is sealed at 18 and includes the flange section 22 sealed against the exterior wall of 18 at wall sections 7', and carries the upstanding flange section 24. The upstanding flange section 24 is bolted by bolts 24' (see FIG. 2) to the flanges 19, 2, 10 and the upstanding flange portion of the irregular flange 17. The wall section of 18 (see FIGS. 6 and 11) beneath the wall section 22 is formed with circumferential ridges 25, carrying a cylindrical metallic shield 26, similar to 16 and 16'. A dependent circular rib 23 (see FIGS. 2, 6 and 11) contacts the metal shield 26, forming two chambers 27 and 28. Water inlet 27' (see FIG. 6) is connected to 27, and the water outlet 28' is connected with the other chamber 28.

The surface 29 (see FIGS. 2, 3, 6 and 12) of the flange 19 is circularly grooved at 30 to receive an O-ring 31 and grooved at 39 to receive a ring valve structure 36. The valve structure 36 acts as a fuel inlet valve. The flange 19 is bored with a port 33 to communicate with the fuel inlet at 37 and a bore 34 and 38 to communicate with the ambient pressure.

The circular groove 39 is formed of a vertical section 58 and a horizontal section 40, forming an L-shaped groove. The end of the flange 19 is relieved at passageway groove 41 to be spaced from the end of the exhaust cylinder flange 2 at a point inward from the face of the flange 2, to provide a passageway 41. Positioned in the groove 40 (see FIGS. 12, 2 and 3) is a ring bellows 42 composed of convolutions of rectangular cross-section formed by grooves 43 and 44 positioned alternately on the interior and exterior of the bellows ring 42. Extending from the end 45 of the bellows ring are two legs 46 and 47 formed by the ring groove 48 in the end of the bellows ring. The legs 46 and 47 are positioned against the narrowed end 49 of the groove 40. The thickness of the bellows ring is somewhat less than the width of the groove 40, providing a space 50 on the exterior and a space 51 on the interior of the bellows. The width of the groove at the end 49 is reduced in width at 52 to make a snug fit with the bellows leg section 46 and 47. The opposite end 53 is positioned adjacent to the face of cylinder 2. It is chamfered to provide an integral ring lip 54' which is pressed against the face of the flange 2, and it also carries an integral outwardly extending ring disc leg 54 spaced from the end of cylinder 2, and carries an inwardly extending lip ring 55 which is pressed against the end surface 32 of groove 58. The disc leg 54 is spaced from the inner surface 32 of the groove 58 by lip 55, providing a chamber 56 on the inboard side of the disc leg 54 and the chamber in groove 58 on the outboard side. Crenelations 57 are formed on the inner surface of the groove 39 in chamber 56. The port 33 connecting to 37 terminates between the crenelations 57, and the passage 34 connecting ambient port 38 terminates in the chamber 48.

The circular check valve 60 (see FIGS. 2, 3 and 11) forms a communication between the scavenger chamber 6 and the compressor cylinder chamber 65. It is composed of two matching ring sections 61 and 62 formed of an elastomer such as natural or synthetic rubber or any other material, whether organic or metallic, having the required flexibility when formed as described herein and shown in the drawings. The cross-section of rings 61 and 62 are the same and are mirror images of each other. The rings 61 and 62 are both formed with an outwardly-extending portion having a triangular cross-section with an apex and a base section. The outwardly extending sections include an angle formed by the opposed surfaces of the rings 61 and 62, and form a passageway 63 of triangular cross-section which communicates with the scavenge case 6. The ring 62' is formed with a thickened base and fits into a groove in dependent wall 6b of the scavenge case 6, and is held in position by a clamping ring 65'. The ring 62 fits in a groove in a ring 62' which seats in the wall of 1 and is held in place by clamp ring 64.

When pressure in the scavenge case 6 exceeds the pressure in the compressor cylinder 65, the flexible ends of sections 61 and 62 are clamped together by the pressure, thus closing communication between 6 and 65. When the the pressure in 65 exceeds that in 6, sections 61 and 62 are spread apart, opening communication between chambers 62 and 6. The double check valves 66 are constructed similarly to the check valve 60, except that they are composed of two identical pairs of flexible rings of composition similar to the composition of 61 and 62, having a cross-section similar to that of the said rings, and having identical function. The check valve has the axis of its rings at 90° to that of the rings of valve 60. The ends of the ring of valve 66 are formed with outwardly-extending trapezoid ridge sections which are retained in grooves formed in the retaining ring 66', which form an end of the starting air chamber 68, formed between the compressor cylinder 69 and the case 70. When the pressure in the inlet of the air manifold 67 exceeds the pressure in 65, the lips of rings 66 separate to open passageway, one through each ring section; and when the pressure in 65 exceeds the pressure in 67, the apices of the contacting triangular sections of the valve are clamped together.

The positioning of the check valves 66 in the wall of the closure 66' permits of the design of the port opening of the valve to match the required rate of flow of air into the compressor. This is particularly facilitated by the annular opening provided by the valve 66. The closure 66' provides the room for the introduction of the desired number of such valves.

The assembly of check valves 60 and 66 described above is duplicated in the side of the engine carrying scavenge ports 20. Thus, two check valves 71 are formed similarly to 66 and are mounted in rings 72, similar to 66' which form the end of the starting air chamber 75, formed between the compressor cylinder 77 and the outer case 78. Valve 79 is similarly constructed as valve 60 except that it is a mirror image of valve 60. It is mounted in the wall 21b in a manner similar to the mounting of 60 in the wall 6b.

Figure 4:
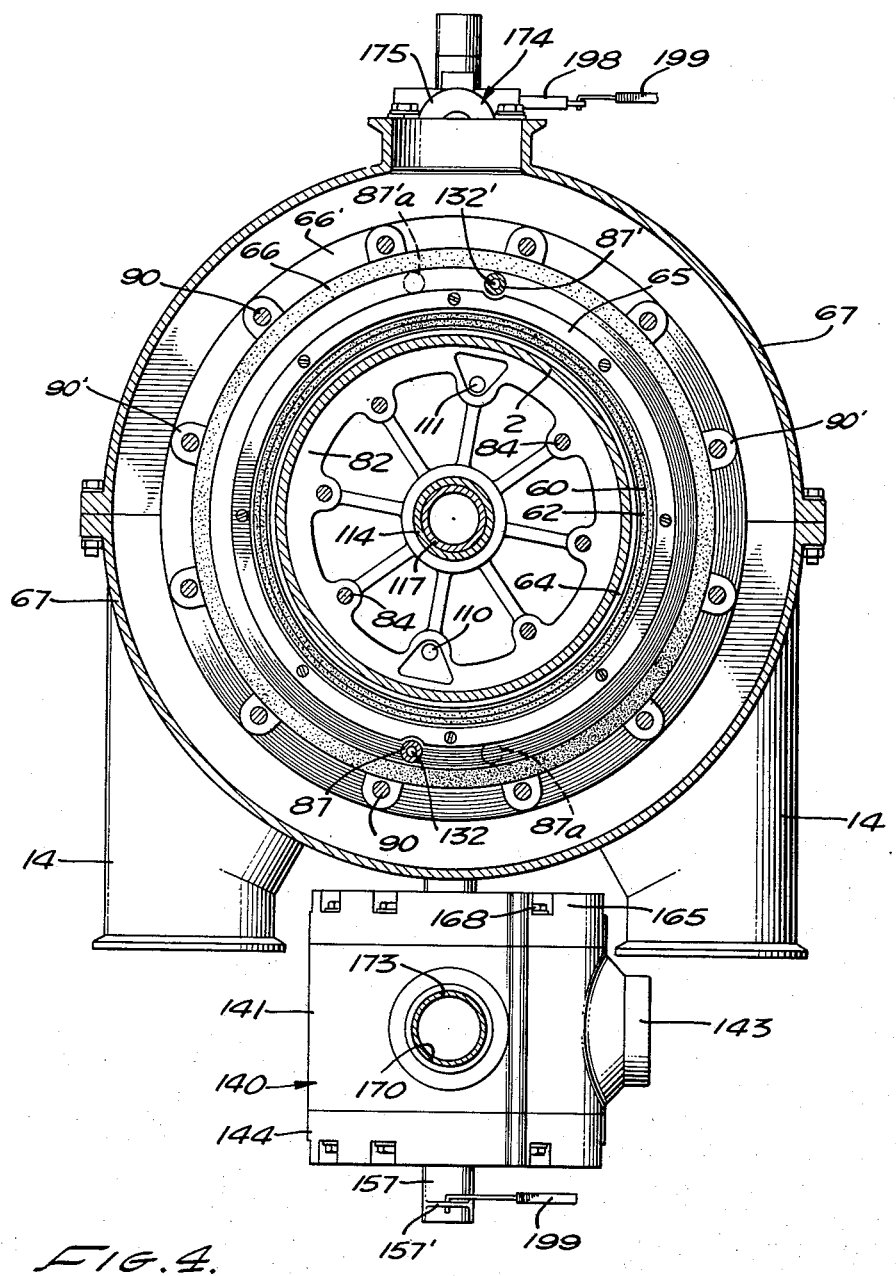
FIG. 4 is a section taken on line 4—4 of FIG. 3.

The flange 7 and flange 9 are formed of two angularly-separated portions 80 (see FIG. 5) to receive two air-balance tubes 81 which connect the chambers 6 and 21. The piston 82 (see FIG. 3) having a piston head 83 is slideably mounted in the cylinder 1 and sealed by piston rings 83' and is bolted by bolts 84 (see FIG. 4) to the compressor piston section and bounce piston section 85, which is connected to the engine piston section. It is formed with a bounce piston head 86 and a flange piston extension which forms the compressor piston 86a with the bounce piston head 86 carrying the piston rings 88. The compressor piston 86a is mounted on the bounce piston head 86 by the control rods 87, to be described below, and bolts 120.

Figures 3A, 8:
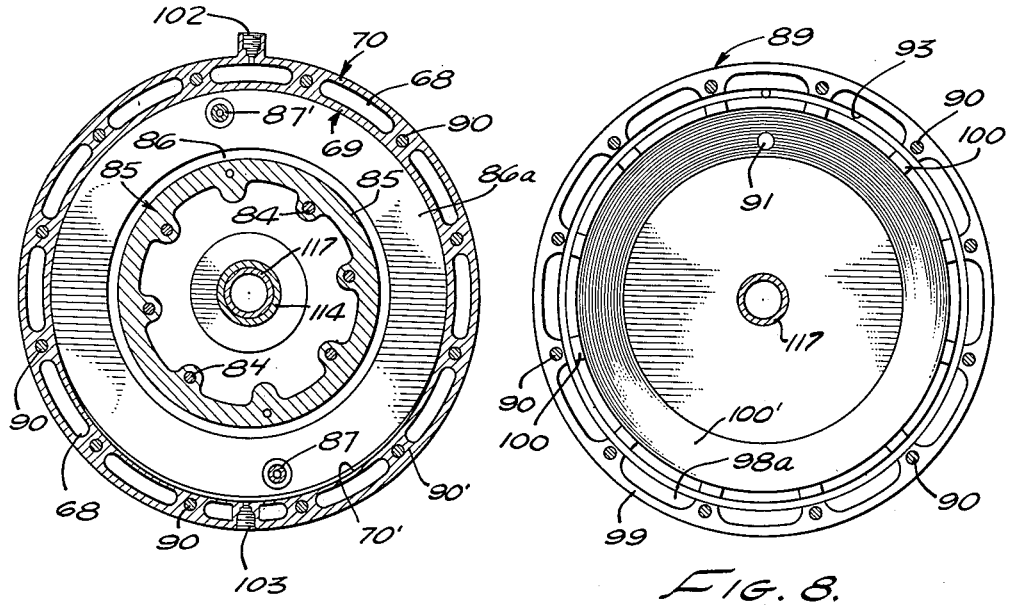
FIG. 3a is a section on line 3a—3a of FIG. 3.
FIG. 8 is a section taken on line 8—8 of FIG. 3.

The bounce cylinder head 89 (see FIGS. 3 and 8) is bolted to the ends of the starting air case 70 by bolts 90. The bolts 90 pass through bridges 90' (see FIGS. 3, 3a and 4), between the exterior and interior wall of the case 70 and positioned within the air starting chamber 68. The bridges end short of of the retaining ring 66' and short of the end of the case 70. The bolts 90 pass through the bridges and retaining rings 66' and are threaded into the wall 6b of scavenge case 6.

Positioned in the cylinder head 89 is a port 91. A second port 92 is positioned in the circumferential rim of the cylinder head 89 and communicates with the circular groove forming the valve chamber 93 (see FIGS. 3, 8 and 13) in which is positioned a ring piston valve 94. The ring piston 94 is of U-shaped cross-section in which the legs 95 and 96 are slightly tapered, converging towards the base of the U. The base of the U is chamfered to provide a narrow annular sealing face 97, which may seat against the surface 98.

The cylinder head 89 is thus employed to provide a valve chamber between the starting air chamber 68 and the bounce chamber 101', to add pressure to the bounce chamber to start the engine. This is done by applying starting air pressure to the ports 102 and 92 and their corresponding ports 102a and 92a, as will be more fully described below. The valve chamber is easily machined in the cylinder head. The ring piston 94 moving away from the sealing surface 98 presents an annular opening of large diameter, and thus large cross section, for a small travel of the piston 94. Because of the small mass of the ring piston, which may be minimized by making the plunger of suitably tough and resilient plastic material, the natural frequency and speed of response of the piston 94 to the actuating pressure may be made large.

By employing a suitable plastic, for example, tetra-fluoroethylene polymer, as for example that sold under the trade name "Teflon" by E. I. du Pont de Nemours Company, or any equivalent material, the plunger will respond to high impact stresses with little wear of the piston and cooperating groove and sealing seat. A plastic plunger will conform under load, and complicated machining and finishing operations for the piston, groove and sealing seat may be avoided. The tapered conformation and U-section creates an area of large surface thus exposed at the chamfered sealing end, and thus the valve will seat when a balanced pressure exists as port 92 and in the starting air chamber 68 and in the corresponding parts at the other end of the engine.

The cylinder head 89 (see FIGS. 3, 8 and 13) is relieved at 98a, in the peripheral edge 99 between the inwardly-extending radial tapered ribs 100 extending from the peripheral ring ridge 99. It is also dished at 100' inwardly from the ends of the ridges 100. The case 70 is sealed against the ring ridge 99 by a suitable seal 99' (see FIGS. 3 and 13). The relieved space between the piston head 86 and the cylinder head 89 forms the bounce chamber 101'. Communication between the starting air chamber 68 and the bounce chamber 101' is blocked by the ring piston valve 94. Positioned in the wall of 69' is a port 103 (see FIG. 3) at a location such that the end of the piston head 86 clears the groove 70' leading to port 103 when it is at I.D.P. (see FIGS. 3 and 3a).

The arcuate groove 70' is formed in the interior wall of the compressor cylinder 65 and intersects the port 103 and the corresponding port 103' in the compressor cylinder 77 at the other end of the engine. This construction provides a simple and highly efficient means for establishing the desired bounce chamber pressure and avoids complicated porting and ducting, as will be described below.

Figure 10:
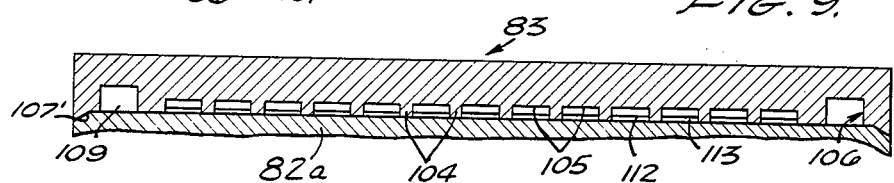
FIG. 10 is a section taken on line 10—10 of FIG. 9.

The piston assembly 82 is formed of an engine piston section formed of the piston head 83 (see FIGS. 3, 9 and 10) whose inner surface carries a series of chordal ribs 104 forming parallel passageways 105. The inner surface of the piston head also has a circular groove 106 adjacent the periphery. The piston head 83 is welded to the assembly 82a, forming piston 82 at the peripheral ridge of the piston head. The groove 106 is interrupted by walls 107, dividing the peripheral groove into outlet 109 and inlet section 108. The sub-piston assembly has a pair of diametrically-positioned bores, 110 and 111 (see FIGS. 3 and 4), which communicate with the grooves 106 at 108 and 109, respectively. It will be observed that the communication between 108 and the 109 is through lands 112 which provide a very narrow passageway 113 (see FIG. 3) between chamber 108 and grooves 105. This passageway 113 is proportioned to provide a capillary restriction, for example, about 0.020 inch in height and whose length is proportioned to give non-uniform fluid velocity distribution of the cooling oil (to be described below) at the entrance of each groove. The length of the lands is inversely related to the length of the said groove 105, to provide a heat transfer to the cooling oil which will be uniform across the face of the head 83.

The passageway 110 and 111 communicates with the passageway 110' and 111' (see FIG. 3), formed in the bounce piston assembly 86 to be connected to the oil-circulation system, as will be described hereinbelow. Positioned between the head of the piston sub-assembly 82a and the bounce piston head 86 is the rigidly positioned tube 114 (see FIGS. 3 and 4), sealed in the head 86 by the O-rings 115 and in the head of the piston sub-assembly 82a by the O-ring 116. The bolts 84 (see FIGS. 4 and 3a) rigidly connect the piston assembly, composed of piston head 82, subassembly 82a, piston 85 carrying the compressor bounce piston 85, as described above. The tube 114 is thus rigidly positioned in this piston and moves therewith, and forms the pump piston section, to be more fully described below. Positioned in the cylinder head 89 is a tube 117 sealed in the head by the O-rings 118 and rigidly mounted thereon to extend into tube 114. This thus forms the pump cylinder, to be more fully described below. The sliding surfaces are suitably honed for fluid-tight sliding connection. The tube 117 is retained in head 89 by the elbow 118', which is bolted to the head by the bolts 119 and sealed by O-rings 115'.

Figure 7:
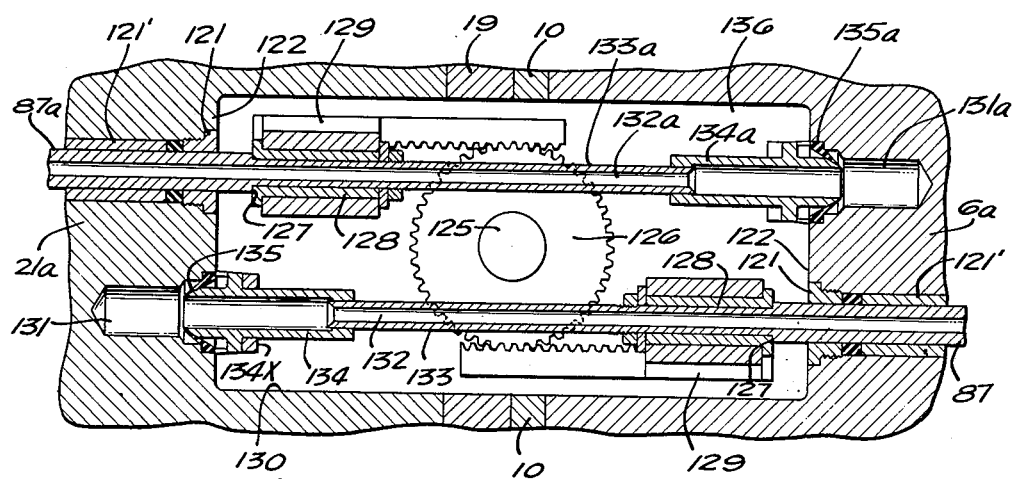
FIG. 7 is a partial section taken on line 7—7 of FIG. 3.

The control rods 87 and 87' (see FIGS. 3, 5 and 7) are of identical construction, are mounted in the piston by means of bolts 120 and extend through the compressor piston section 86a of the bounce piston 85, through the compressor section 65 and the wall through a packing gland 121 and a bushing 121' positioned in the pads 122. The pads 122 are positioned in the wall 6b of the exhaust scavenge case 6, and are positioned between the forks 123 (see FIG. 5). The control rod 87, which extends through the bushing 121', is necked down at 127 and carries the bushing 128, which carries a rack 129 which meshes with the gear 126, to be described below. It will be observed (see FIG. 3) that the rod 87 carries a bore 132 through the rod and which communicates with the passageway 110' through the bore 131 and passageway 130. The bore of the rod 87 communicates with the bore of the rod extension 133, which makes a sliding and fluid-tight seal in the bore of the cylinder 134, which is mounted on pads carried on the scavenge case 21 by clamps 134x. The end of the cylinder 134 is chamfered and communicates with the blind bore 131 positioned in the wall of scavenge case 21 through check valve 135 formed of a circular ring similar to one of the rings of valves 60 and 66 of smaller diameter but of similar cross section.

It will be observed that the bounce piston section 86, which is connected to the engine piston section, being integral therewith, carries a control rod 87' at the top, similar to 87 at the bottom, as shown in FIG. 3. The control rod, marked 87', is similarly constructed and mounted to 87, described above, and carries a rack 129' (see FIGS. 3 and 5), which engages a pinion 126' (see FIGS. 3 and 11), mounted upon the fuel pump stem 125', as will be more fully described below. The rod 87' is bored and communicates with a cylinder assembly similar to 134 and mounted in the scavenge case similar to 134. This construction is not illustrated, since it duplicates the previously described and illustrated construction. The bore of 87' communicates with bores 111', as shown in FIG. 3, and with a cylinder and valve assembly of the same construction as 135'a, described below. The details of that construction are not shown, because it is amply illustrated by the assembly described in connection with the control rod 87 and control rod 87'a.

The piston and sub-piston assembly and construction in the scavenge section of the engine in cylinder 18, except for the features specifically described herein, are substantially identical with that described for the piston in the exhaust section of the engine. The control rods connected to the exhaust pistons and the control rods connected to the scavenge section pistons are similarly constructed and similarly arranged except that they are oppositely directed. The lower control rods for the scavenge section pistons are marked with numbers carrying a suffix "a," for parts having the same function, and are similarly constructed as the numbered parts for the exhaust section pistons. The parts in the scavenge cylinder section marked with a letter "a" thereafter are of the same construction and function and arrangement as those of the control rod parts with primed and unprimed numbers without letter "a," as will be more fully described below.

As described above, the engine is formed of two similar sections which are bolted together at a central flange section 24, 9, 10, and the upstanding flange portion of 17, all of which abut and are bolted by bolts 24 (FIG. 2), to form a rigid assembly. Each engine section is formed of an engine cylinder section telescoped within a compressor cylinder. The piston assembly carries the engine piston head at one end and a compressor and bounce piston section at the other end. The bounce cylinder is positioned between the end of the compressor cylinder section and the cylinder head.

The scavenge case is in the form of a U-shaped section, with the legs of the U positioned on the engine cylinder section. The engine cylinder passes through the legs of the U into the compressor cylinder. The starting air chamber is positioned circumambiently about the compressor cylinder. The engine cylinders are assembled, together with the compressor cylinder and the starting air case, by clamping the compressor cylinder ends and the cylinder heads, the sections mating at the flanged ends of the cylinder. The scavenge cases carry a flange at their inboard end, which is nested against the flange positioned at the inboard end of the engine cylinders. The assembly is clamped by through bolts passing through the bounce and compressor cylinder heads, the starting air cylinder and the scavenge cylinder clamping them between the bounce cylinder head. The engine cylinders are clamped by through bolts at the flange ends of the scavenge case and engine cylinders. This assembly not only constitutes a simple and flexible construction, but the thermal expansion extends outward from the center of the assembly, at the bolted flanges described above, thus avoiding thermal strain in the cylinders and other parts.

By telescoping the engine cylinder within the compressor cylinder, the overall length of the engine has been reduced. Since this may be done without reducing the free cross sectional area of the compressor cylinder, the total volume of the engine envelope is also reduced.

By making the scavenge case in the form of a nested annular ring, I may select the linear separation between the legs 6b and 7 of the U-shaped section, and thus attain the desired scavenge chamber volume without unduly increasing the overall external diameter of the engine or the scavenge case. The air balance pipes 81, positioned externally of the engine cylinder and the scavenge case, permit of a simple construction with a minimum of ducting and permits the equalization of the scavenge case pressure in the scavenge case in both engine sections. This also results in a more compact unit and a reduction in the overall diameter and volume occupied by the engine assembly. The positioning of the starting air case 68 exteriorally of and circumferentially of the compressor cylinder permits of the attainment of a large volume of the starting air chamber with but a small increase in the external diameter of the engine. It also avoids the use of auxiliary starting air cans and the external ducting, valving and plumbing employed in prior art engines.

This arrangement also provides for the positioning of water passages 27, 25, 28, 15 and 16 (see FIGS. 2, 6 and 11), between the external flange 22 of the scavenge air case 21a and the exhaust cylinder section 18, and between the external flange of 17 and the exhaust engine section 1.

The racks 129 and 129a (see FIG. 7) are positioned at diametrically opposed parts of the pinion 126, and in like manner the racks 129a and 129'a are oppositely-positioned at the diametrically opposed portion of the pinion 126' in the fuel pump section (see FIGS. 3 and 11), as will be more fully described below.

The rack and pinion assembly 129 and 129a, described above, are enclosed in a case 136 (see FIGS. 3 and 7), which is seated on the scavenge cases 6a and 21a and carries an oil inlet 137. The rack and pinion assembly associated with the fuel pump gear 126' is enclosed by a case 138 seated on the walls of 21 and 6, and carries an oil port 139. The valve 135 and the similar valve associated with control rod 87' are positioned in an opposite manner to valves 135' and the valve 135'a (see FIGS. 3 and 7). Thus, they allow opposite directions of free-flow and check functions, as the control rods reciprocate with the piston, pumping the oil into one set of rods on one side and out the control rods on the other side, as will be more fully described below.

The by-pass valve 140, shown on FIGS. 1, 3, 5, 14 and 15, and particularly FIGS. 14 and 15, is composed of a housing 141 carrying a chamber 142 in which a bore 143 is provided. The housing 141 is closed by a bottom 144 which also closes the bottom of the chamber 142. The bottom 144 carries a bore 144a, and bearing 144b and seals 144c. Positioned on the wall of the housing 141 and above the bottom 144 is a spider 145 carrying a valve ring member 146. A valve 147 of construction similar to those described in connection with valves 60 and 66 is positioned in the ring 146. At the top of the housing 141 is a similar spider and valve ring 147' carrying like valve 148.

The load-selector valve member 149 is composed of a tubular member 150 carrying a top and bottom continuous circumferential rib 151 and 152 and four vertical ribs 153, two positioned on one side and two on the opposite diametric side of the cylinder 150 and connecting ribs 151 and 152. Spaced along the length of the tubular member is a plurality of circumferentially spaced interrupted ribs 154. Positioned between two adjacent vertical ring members 153 on one side of the cylinder is a plurality of spaced rectangular openings 155, there being four shown on the drawings (FIG. 15). The remaining surface of the cylinder is not ported. The cylinder 150 is open at the top and carries a spider 156 connected to the shaft 157 which passes through 144a, 144b and 144c.

The position-selector valve member 158 is composed of a top ring member 159, connected to a spider 160, which, in turn, is connected to the spline shaft 125 on which the pinion gear 126 is mounted (see FIG. 3). The bottom of 158 is open and carries a ring member 161. Between the ring members 161 and 159 are three spaced ring members 162. The rings are connected by semi-circular spacer member 163 providing semicircular passageways 164 between the rings 162.

The valve member 158 fits between the valve member 149 and the inner wall 164' of the case 141, and is positioned so that the exterior cylindrical surface of the ribs 159, 161 and rings 162 are positioned contiguous to the interior cylindrical surface 164'. The exterior cylindrical surfaces of the ribs 151 and 152 are positioned contiguous to the inner cylindrical surface of 159 and 161, respectively, and the exterior surface of each of the interrupted ribs 154 is positioned against the contiguous inner cylindrical surface of the corresponding ring 162. The exterior cylindrical surfaces of the vertical ribs 153 are on the same geometric surface as ribs 151, 152 and 154.

The cover 165 contains a bore 166 through which the shaft 125 passes and closes the top of the housing 141 and the chamber 142. Suitable bolts 168 pass through the bores 167, and the case is mounted on case 136 by the studs 168' passing through the bore 169 (see FIG. 3). The housing 141 carries two diametrically opposed bores, 170 and 171, positioned at 90° to the bore 143. The bores 170 and 171 are connected by pipes 172 and 173 to the elbows 118'a and 118'. (See FIGS. 1, 2 and 3.)

It will be observed that the inner surface of cover 165 is relieved at 172', where the cover fits on the housing 141. The spider 145 is spaced from the bottom 144. The load selector, valve 149, may be angularly positioned by the shaft 157 and cable 199 (see FIG. 4), thus positioning the openings 155 angularly about the axis of 157. The reciprocation of the pistons, as will be more fully described below, causes the reciprocation of the control rods and the racks to cause an angular oscillation of the pinion gear 126. The opening 155 thus is caused to oscillate angularly, and, depending upon its initial angular position, will either oscillate in the area defined by the passageways 164 or partially or totally within the area defined by the interior surface of 163. This initial positioning of the opening 155 thus determines the portion of the stroke at which the opening 155 is within the area between the rings 159, 162 and 161, which are open, to wit: the area 164, and during which communication between 170 and 171 is obtained. It also determines the portion of the stroke during which 155 is within the area of the space of 163 and during which time the communication between 170, 171 and 143 is established. The functioning of these valves and its relationship to the stroke will be more fully described below.

Figure 11:
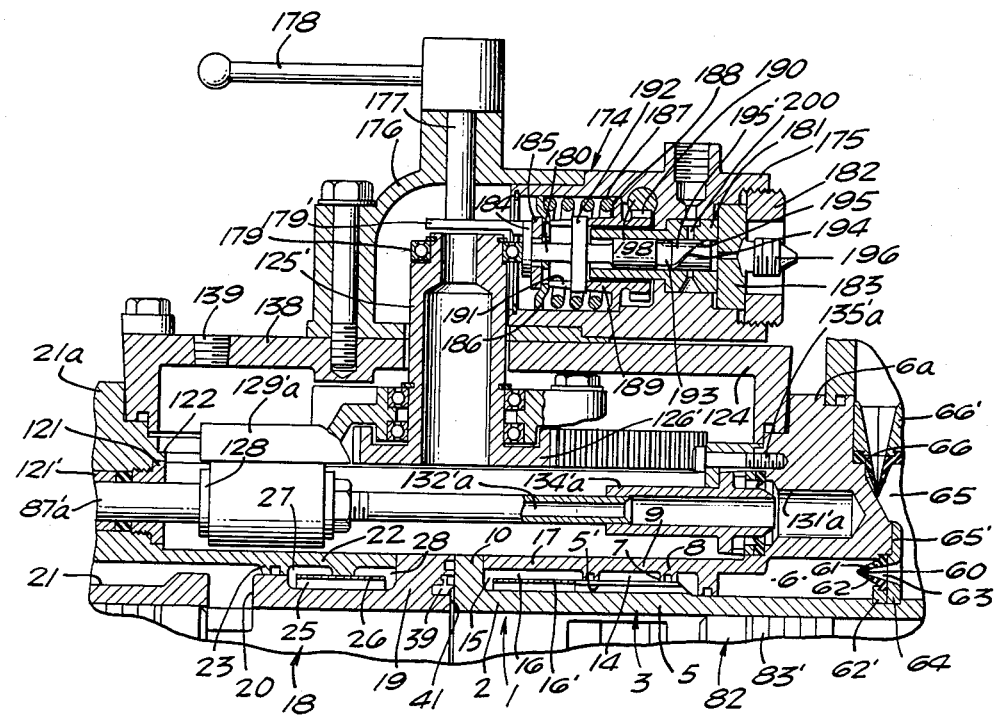
FIG. 11 is an enlarged detail of FIG. 3.

Referring to FIG. 11, the fuel pump 174 has a housing 175 which is attached to the fuel pump support bracket 176 mounted by bolts to the cover 138. This bracket 176 is bored for an axle 177 carrying the handle 178 and which carries an eccentric cam 179'. The pinion 126' carries on its axle 125' a bearing mounted eccentrically to form the fuel pump actuation cam 179. The plunger 180 of the fuel pump slides in the bore of the cylinder 181 of the fuel pump. The cylinder is held in place in the fuel pump housing by the threaded retaining ring 182 which locks the fuel pump cylinder cap 183 against the end of the cylinder 181. The opposite end of the plunger 180 has a mushroom flange 184 which fits in the recess of a split washer 185, held in place by the outboard spring retainer 186. The plunger return spring 187 bears on the outboard side of the spring retainer 186 and on the inboard section against the flange 188. The flange 188 is appended from the barrel 189 which carries pinion gear 190. The barrel 189 at its inboard end has a milled slot 191. The fuel pump plunger carries a rectangular cross bar T 192 which fits in the slot 191. The fuel pump plunger 180 on its pumping end carries a circumferential groove 193 and a helical ramp surface 194 and a longitudinal groove 195', which communicates with the plunger chamber 195 and the groove 193. Mounted on fuel cylinder cap 183 is a fuel attachment fitting 196 to which the fuel pump injector line 197 is attached (see FIGS. 1 and 6). The rack 198 meshes with the gear teeth of the pinion 190. The rack is circular in cross-section, except at that portion where the gear teeth are cut, and is positioned at right angles to the axis of the fuel pump plunger 192. The rack 198 is positioned by the cable 199 (see FIG. 4).

As is well known to those versed in the art, the action of the fuel pump described above is conventional and similar to fuel pumps employed in the prior art, in that the stroke of the fuel pump is such that the plunger during the fuel pump stroke, caused by the rotation of the eccentric cam 179, alternately closes and exposes the fuel inlet port 200. During the period of the stroke when the plunger covers 200, the fuel is compressed in 195 and line 197, fuel inlet port 37, and 33, and the chamber 56 and grooves 44 (see FIG. 12). At some portion of the stroke the fuel inlet port 200 is uncovered to connect port 200 to the chamber 195. The pressure on the fuel is thus quickly reduced. The position of the plunger 192 at which this connection is made is determined by the angular position of the helical ramp and is set by the rack 198. The fuel pump previously described is conventional in construction except, unlike prior art fuel pumps of this design, in the construction employed in this application there is no check valve between the pumping cylinder 195 and the fuel injection nozzle which, in this invention, is fuel valve ring 36 (see FIG. 12).

Figure 1:
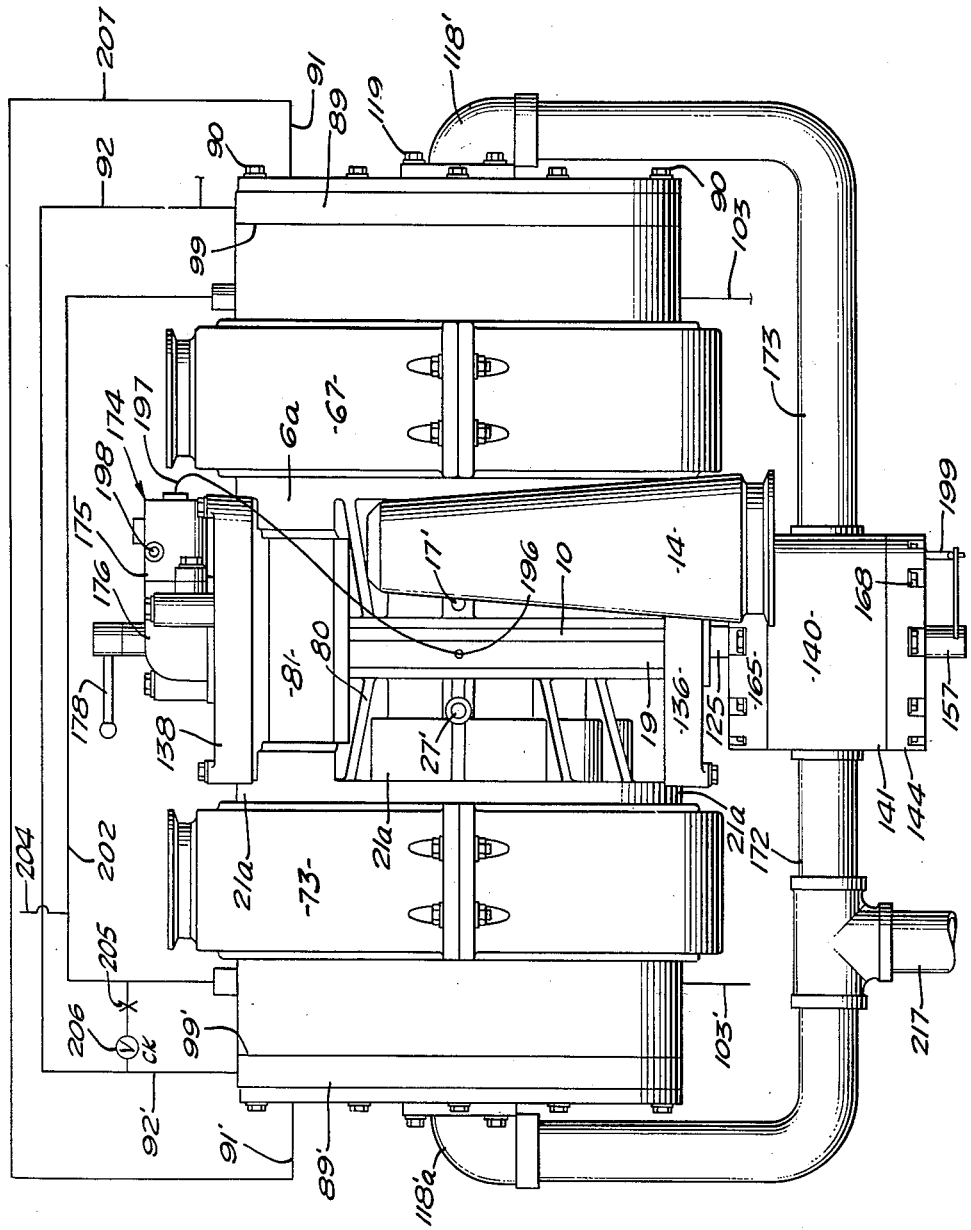
FIG. 1 is a plan view of the engine.
Figure 16:
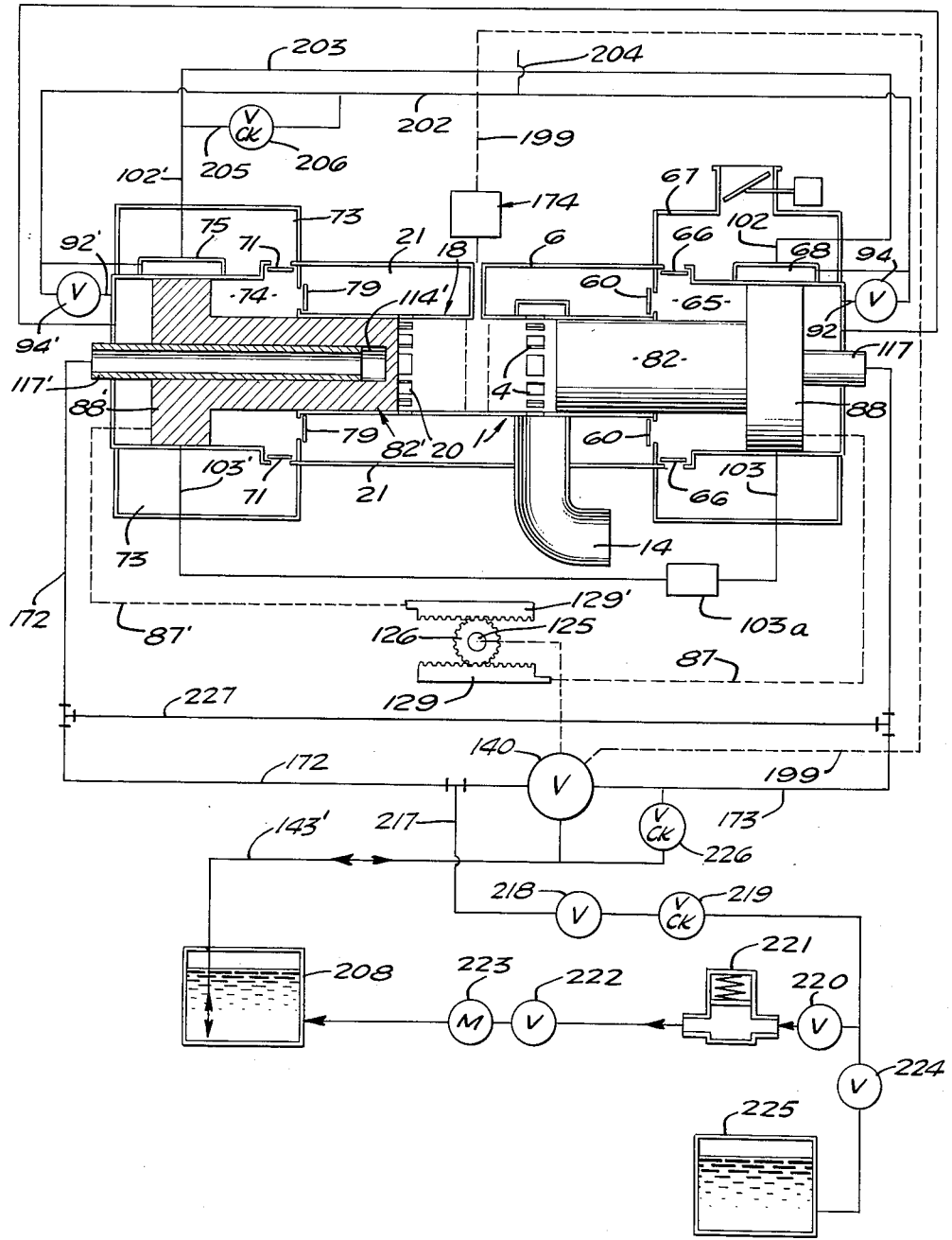
FIG. 16 is a schematic diagram of the engine and its fluid piping.

The external plumbing for the engine is shown in FIGS. 1 and 16 and constitutes one possible inter-connection, and for the purposes of the further description constitutes a preferred embodiment of my invention, although it will be understood that other plumbing arrangements for further or different uses of this invention may be employed. FIG. 16 shows a schematic diagram with parts represented schematically carrying the same members as those parts which they represent and which have been described in FIGS. 1 through 14.

The starting air valve 94, which is as shown on FIG. 3, is positioned in the cylinder head, is shown for schematic purposes in FIG. 16 externally of the engine which is shown in schematic form in FIG. 16. The port 92 and valve 94 have a like companion port 92' and a valve arrangement 94' in the scavenge cylinder section, as has been described above. They are manifolded together through line 202, to which is connected the starting air line 204 from a source of high-pressure air. The port 102 is connected to the line 203, as has been described above, and to a corresponding port 102', which is connected to the starting air case 75. These are manifolded in line 203 which is connected to 202, through restriction 205 and check valves 206. The ports 103 and 103' are connected to a tank 103a whose pressure may be controlled.

The cooling water circuit as described above (see FIG. 6) circulates water through 27' into chamber 27 around the scavenge cylinder between the ridges 25 into chamber 28 and out line 28'. It also passes into line 17' into chamber 15 around the exhaust cylinder through grooves 16 and bores 5 into chamber 13' and out line 15'.

The cooling and lubricating oil (see FIGS. 3 and 9) circulation in the exhaust piston section is through port 137 into case 136 and is pumped via valve 135, cylinder 134, bore tubes 133, bored control rod 87, port 131, passageways 130, 110' and 110, chamber 108 (see FIG. 9), through the capillary passageways 113 between passageways 105 into chamber 109, passageways 111, 111' and 113, passageway 131', port 130', bore of 87' and the pump assembly associated with the control rod 87' which is of a construction the same as that associated with 87, as described, except for the orientation of the check valve to act as a discharge check valve as described below in connection with the control rod 87'a. The oil is thus discharged through a valve associated with 87', which valve is of a construction and function similar to 135'a associated with control rod 87'a and into case 138 and out through port 139.

The oil circulation for the scavenge piston is the same as for the exhaust piston. The oil intake from the case 136 is pumped by the control rod pump 87a, of construction identical to that described for control rod 87 and is circulated through the piston in the same way as described above for the exhaust piston. The oil passing from the case 136 into control rod through the valve 135a passes into the cylinder 134a, into 87a and through the piston, in the same manner as described for the exhaust section piston, and through the control rod 87'a (FIG. 3), cylinder 134'a, and is discharged through the check valve 135'a into the case 138.

Line 217 (see FIG. 16) is connected to line 172 and through valve 218 and check valve 219, and valve 220 to the accumulator 221 or through valve 224 to the tank 225. From the accumulator 221 the oil may pass through valve 222, fluid motor 223 to sump tank 208. From the sump tank 208 the oil may pass through line 143' connected to bore 143 and into the load selector valve 140. The check valves 147 and 148 of the load selector valve are shown schematically in FIG. 16 as check valve 226. The cross connection between 173 and 172, which is obtained in the casing of the selector valve 140 (see FIG. 3), is shown schematically in FIG. 16 by line 227.

Figures 9, 13:
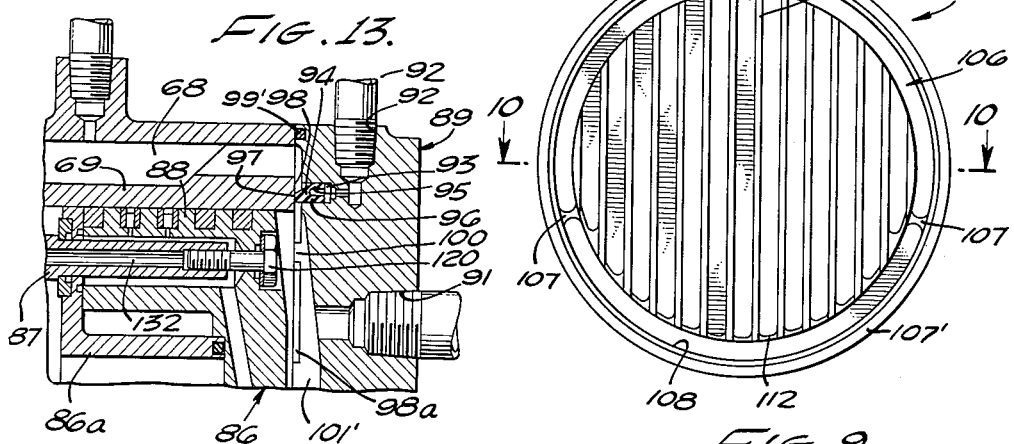
FIG. 9 is a section taken on line 9—9 of FIG. 3.
FIG. 13 is an enlarged detail of FIG. 3.

The operation of the engine will be described below. To start the engine, we will assume that the pistons are at their outer dead point as shown in FIGS. 2, 3 and 16, and that ambient pressure is in the bounce chamber 101'. Referring to FIGS. 3, 13 and 16, air under pressure from an external source is introduced through 204 into lines 202 and 203, so as to pressurize the chambers 68 and 75. Air enters between the bridges 90' (see FIGS. 3, 3a and 4) and fills the space 68 between all of the bridges, due to the communication around the ends of the bridges adjacent the clamping ring 66', and at the relieved portion between the ribs 100 (see FIGS. 3, 8 and 13).

Air pressure is simultaneously introduced through ports 92 and 92' into chambers 93 and 93' of the valves positioned in each cylinder head. Due to the restriction 205, the chambers 93 and 93' are fully pressurized before the start air chambers 68 and 75 are raised to the same pressure. The pressure in 93 seats the face 97 of each of the valves against the end of the cylinder. Pressures in 93, 68 and 75 are thus equalized, but due to the fact that the valve 94 is formed with a surface exposed to the pressure in 93, which is greater than the surface of the valve exposed to the pressure in 68 or 75, respectively, the valve remains seated. Pressure in line 204 is released to atmosphere. Thus venting chamber 93 (FIG. 13). The check valve 206 closes communication between 68 and 74 and 204, to prevent venting of 68 and 75. The stored pressure in 68 and 75 thus forces the valve 92 back into the groove 93, opening communication between 68 and the bounce chamber 101' in the exhaust and between 75 and bounce chamber 101' in the scavenge cylinder sections.

The pressure in the bounce chambers thus forces both pistons towards each other to their inner dead point, I.D.P. In doing so, the pistons 88 and 88' clear the ports 103 and 103', and pressure from an external source of the required magnitude is introduced into 103 and 103' and connect the bounce cylinders with the reference pressure in 103a, to establish the desired bounce cylinder pressure at 101' in both the exhaust and scavenge sections. Or in case the pressure in the bounce cylinders at the time these ports 103 and 103' are exposed is greater than the desired mean reference pressure which is maintained in 103a, this bounce pressure is relieved so as to establish the desired bounce pressure desired at this point of the stroke.

The piston head 88 clears the groove 70' (see FIGS. 3 and 3a) by only a small fraction of its stroke and exposes a large open area at 70'. Since the volume of the groove 70' is under the pressure of the reference pressure source, the time interval for establishing the reference pressure in the bounce chamber is made minimal. Since the lower the fraction of time required to establish the reference pressure with respect to the time of piston travel, the greater the efficiency, the above constructions results in a maximizing of the engine efficiency.

With the pistons at their I.D.P. (see dotted position in FIG. 16), the scavenge ports 20 and the exhaust ports 4 are both covered, and the groove 42 (see FIGS. 3 and 12) is positioned between the ends of the pistons 83 and 83'. During the travel of the pistons towards their I.D.P. (see FIGS. 3 and 11), the control rods are carried with the piston, and the racks rotate the pinion 126' in the case 138 and pinion 126 in the case 136. The rotation of the pinion 126' rotates the fuel pump axle extension 125' and 177 and actuates the cam 179, which actuates the fuel pump to pressurize the fuel in 195, which has been drawn into the chamber 195 through the port 200 from a fuel source. The pressure of the fuel in chamber 195 thus rises. When the pistons have reached the point just before their I.D.P., the fuel pump by-passes and allows pressure in 195 to vent through 195', to 200 and to drop the chamber 195 to the fuel source pressure.

Figure 12:
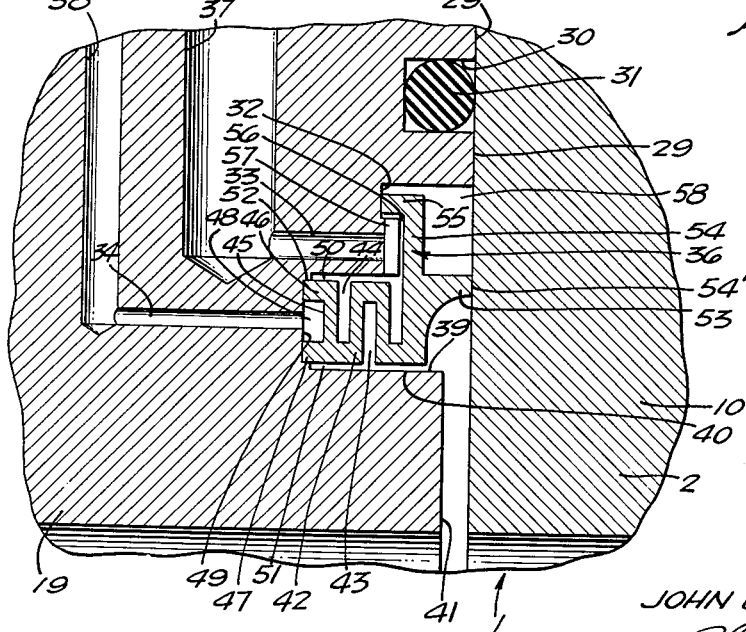
FIG. 12 is an enlarged detail of FIG. 3.

Referring to FIGS. 11, 12, 13 and 16, in the period during which the pressure rises, i.e., when the pistons have been travelling inboard, the fuel is present under pressure in 196 and 197, and in 37 and in the spaces 57 and 50 in the fuel feed side of the bellows ring (see FIG. 12). The spaces 48 and 38 being at ambient pressure, the unbalance of pressure causes the leg 54 of the fuel injection ring to lift off the face 32 of the groove 39, thus raising the pressure in the fuel accumulator cavity 58 in groove 39. The fuel seal lip 54' of the ring remains closed against the face 2, since the area of the ring exposed to groove 50 and 57 is greater than the area of 54 exposed to the pressure in 58, so that the forces to seat 54' are greater than those which tend to unseat 54'. In addition, the other end of the bellows section tends to remain sealed, since the cavity 56 is at a higher pressure than the space 48 which communicates to ambient pressure, and therefore the legs 46 and 47 seat against the face of the groove. During the period of the inward stroke of the pistons to I.D.P. the air compressed in the engine section between the pistons and in the spaces 51 and 43 is simultaneously rising, and the pressure in cavity 43 and in the groove 51 helps to hold the legs 46 and 47 against the flanged face of the groove. This in effect gives a simultaneous seal of both ends of the bellows fuel injection ring during the simultaneous fuel and engine pressure rise in the respective cavities.

Just prior to the I.D.P. as above mentioned, when the fuel pump by-passes, the pressure in the fuel ring cavities 50 and 56 drops to the fuel source pressure. The fuel stored under pressure in 58 forces the bellows section of the ring to contract against the legs 46 and 47, the lip 54 deflecting sufficiently for this purpose. This is aided by the pressure in 43, due to combustion engine pressure in 43 acting against the end 53. This deflection of the bellows ring section unseats the fuel seal at 54', allowing the pressurized fuel in 58 to pass out immediately through 41 into the combustion chamber in a circular sheet.

The helix 194 of the pump is fashioned in such a way that it provides a variable start of injection, depending upon the fuel pump plunger's position as is determined by the linear position of the rack 198. The termination of injection is constant regardless of the position of the plunger, since it is determined by the design of the helix and of the by-pass 195 and the port 200.

The combined action of fuel pump and fuel injector ring is as follows: Having selected a predetermined volume of fuel to be displaced by the pump and injected, which, in turn, has been selected by the linear position of the rack 198, fuel is pressurized in the pump chamber 195, in line 197 and in the accumulator section 58 of the fuel ring. The pressure rises in the whole system due to the compression of the fuel. Because of its bulk modulus of elasticity, the fuel acts as a spring and may be compressed elastically. The bulk modulus of the liquid fuel is expressed in pounds per square inch per cubic inch, at ordinary temperatures. This means that a given volume in cubic inches of fuel at ordinary pressure may be compressed into a space of lesser volume by applying the required pressure "$x$." When this pressure is released to a lower pressure, the liquid will expand. The pressure and the percent compression of the fuel will depend on the stroke of the fuel pump piston as described above.

Since the volume of chamber 195, fuel passageways connecting to accumulator 58 are fixed, the volume of fuel expanded into 41 will depend on the stroke of the plunger 192 and the pressure in the engine cylinder at I.D.P. Thus, by controlling the position of the rack 198 this also controls the volume of the fuel introduced per stroke through the fuel ring into the chamber 41.

Referring now to the air compression cycle of the engine upon starting the engine and the inboard travel of the pistons towards their I.D.P., the initial pressures in the cylinders 1 and 18 and in the chambers 6 and 21 and 65 and 74 are at ambient pressure. As the pistons move towards the I.D.P. as a result of the pressure developed in the bounce cylinders, as described above, the compressor piston 86a and 86'a compresses the air in 65 and in 74, closing the valves 66 and 71 and opening the valves 79 and 60, to develop compressor pressure in 21 and 6 and causing the air to be forced through the scavenge ports 20 into the port 4 and through the exhaust manifold 14. As the pistons continue their travel toward I.D.P., the ports 20 first close. The piston 82 covers the ports 4, and the air trapped between the pistons is then compressed and its temperature rises. Fuel is injected, as previously described, through the injection groove 42, and combustion takes place in the chamber between the pistons.

The pistons then start their outboard travel towards their O.D.P. The exhaust ports 4 are first opened. Then the scavenge ports 20. The check valves 60 and 79 close, since the pressure in the scavenge cases 21' and 6' is higher than in the compression cylinders 74 and 65, due to the outboard travel of the pistons. Air under pressure contained in 21 and 6 is introduced through the ports 20 into the chamber between the pistons. The air scavenges the system and discharges the combustion products through the ports 4 into the exhaust manifold 14. During the outboard travel of the pistons to the O.D.P., the air from 67 and 73 is introduced through the valves 66 and 71, which opens as described above due to the drop in pressure in the compressor cylinder 65 and 74. The valves 79 and 60 remain closed.

On the inboard stroke of the pistons 82 and 82' to their I.D.P., fluid, for example oil (see FIG. 16) is drawn from the tank 208 through the check valve 226 into line 173 and through line 227 into line 172.

On the outboard stroke of the pistons to their O.D.P., oil is pressurized in chambers 114 and 114' and tube 117 and 117', lines 173 and 172, and into line 217, valve 218, and check valve 219, and either through valve 220 or valve 224. It may thus pass through the accumulator 221 through valve 222 and hydraulic motor 223 back to the tank 208, or by closing the valve 220, the oil may be passed through 224 into a tank 225.

As will be understood by those skilled in the art, liquids other than oil may be pumped as described above. Also gaseous fluids may be pumped and the compressed gases utilized either in fluid motors or used in any way compressed gases are utilized.

The by-pass 143 provides a means for reducing the pressure in lines 172 and 173 at the desired portion of the stroke. By positioning the port 155 by means of the handle 157, the port 155 is placed in communication with ports 170 and 171 as seen in FIG. 14, at the desired angular rotation of the pinion gear 126, and thus at the desired portion of the stroke of the pistons as reflected by the stroke of the racks 129 and 129a. Oil under pressure from 170 and 171 enters through 155 into the interior of the valve member 149 and, as described above, through the valves 147 and 148 into the chamber 142 and into line 143' through port 143, back to the tank 208.

Referring now to the selector valve 140 (FIGS. 14 and 15), the position selector valve member 158 is oscillated through the medium of the pinion gear 126 and the racks 129 and 129a, as described above. By means of the handle 157, the port 155 has been so positioned that during the inboard and outboard stroke of the pistons the blank portions of the space 163 move over for the port 155 for a predetermined fraction of the stroke. Communication between ports 170 and 171, and therefore lines between 172 and 173, is established through the spaces 164 between the ribs 161 and 159 and 162 and the inner face of the wall 164, and between the ribs 154, ribs 151 and 152.

The positioning of the valve member 149 by means of the handle 157' (see FIG. 3) also positions the rack 193 of the fuel pump (see FIGS. 5 and 11) and thus regulates the fuel injected and thus the fuel-air ratio to correspond to the setting of the by-pass port 155 for the purposes to be described below.

The linkage 199 between 157' and the fuel pump rack 198 as shown makes a fixed relation between the change in fuel pressure and therefore amount of fuel feed and the change in point of the stroke where by-pass occurs. The fuel rack and the by-pass may be independently positioned to the desired amount by disconnecting the linkage 199. If a predetermined ratio other than a one-to-one relation, or if a non-linear relation is desired for the movement of the fuel pump rack and position of 157, the necessary linkage ratios may be introduced into the connection between 157' and 198.

The dynamic balance of the engine is given by the following force equations:

$$F_1 = F_2 + F_3 - F_4 - F_5 + F_6 \quad (1)$$
$$F'_1 = F'_4 + F'_6 - F'_3 - F'_2 - F'_5 \quad (2)$$

Where the unprimed values of F are the forces on the piston during the outstroke, to O.D.P., and the prime values are those during the instroke to I.D.P. (see FIG. 16).

$F_1$ is the net balance of forces on the piston.
$F_2$ is the force on the piston exerted by the gases in the combustion cylinders 1 and 18.
$F_3$ is the force exerted by the gases in the compressors 74 and 65.
$F_4$ is the force exerted by the gases in the bounce chambers 100 and 100'.
$F_5$ is the equivalent friction force.
$F_6$ is the hydraulic or other fluid force in 117 and 117'.

$F_2$ and $F'_2$ vary exponentially, depending on the compression ratio and the fuel-air ratio; $F_3$ and $F'_3$ vary exponentially, depending on the time cycle of the compressor and the design of the scavenge and exhaust ports; and $F_4$ and $F'_4$ vary along an exponential curve; and $F_5$ and $F'_5$ may be taken as substantially constant, and the magnitude is small as to be of secondary effect; and $F_6$ and $F'_6$ remain substantially constant if the back pressure is maintained constant by proper manipulation of the valves and suitable controls, as described more fully below.

The net force in Equations 1 and 2 become zero when $$F_2 + F_3 = F_4 + F_5 \quad (3)$$

And when:

$$F'_4 = F'_3 + F'_2 - F'_5 \quad (4)$$

Both of these balances occur, and the net force due to gas pressure exerted on each side of the piston goes to zero, at substantially that point of the in and out stroke when the piston velocity reaches its maximum value. The remainder of the stroke is then completed because of the stored kinetic energy of the piston, which on the outstroke completes the compression of the gas in the bounce cylinder and on the instroke the compression of the gas in the compressor and in the engine combustion cylinder.

The zero net force occurs at the point of maximum velocity of the piston, since the net force changes in sign as the pistons continue their travel beyond the zero net force point and the pistons decelerate as they expend their kinetic energy to overcome the decelerating force and come to their respective dead points. For a given set of conditions this occurs at the same point of the in and out stroke. Any condition which determines the position of the zero net force point for the inboard stroke will also set the position of the net zero force point on the outboard stroke. In any given engine of the design of my invention, that point in the stroke where zero net force is obtained and maximum velocity is attained is fixed, since in order to complete the stroke the piston must have a fixed kinetic energy. If this point of zero net force is changed due to variations in gas pressure, or resulting from variations in the load in the pumping cycle, or change in fuel-air ratio, or for other reasons, this point may be attained when the maximum velocity of the pistons for storing the requisite kinetic energy has not been reached, and therefore the pistons will not have the necessary kinetic energy to complete the stroke.

Figure 17:
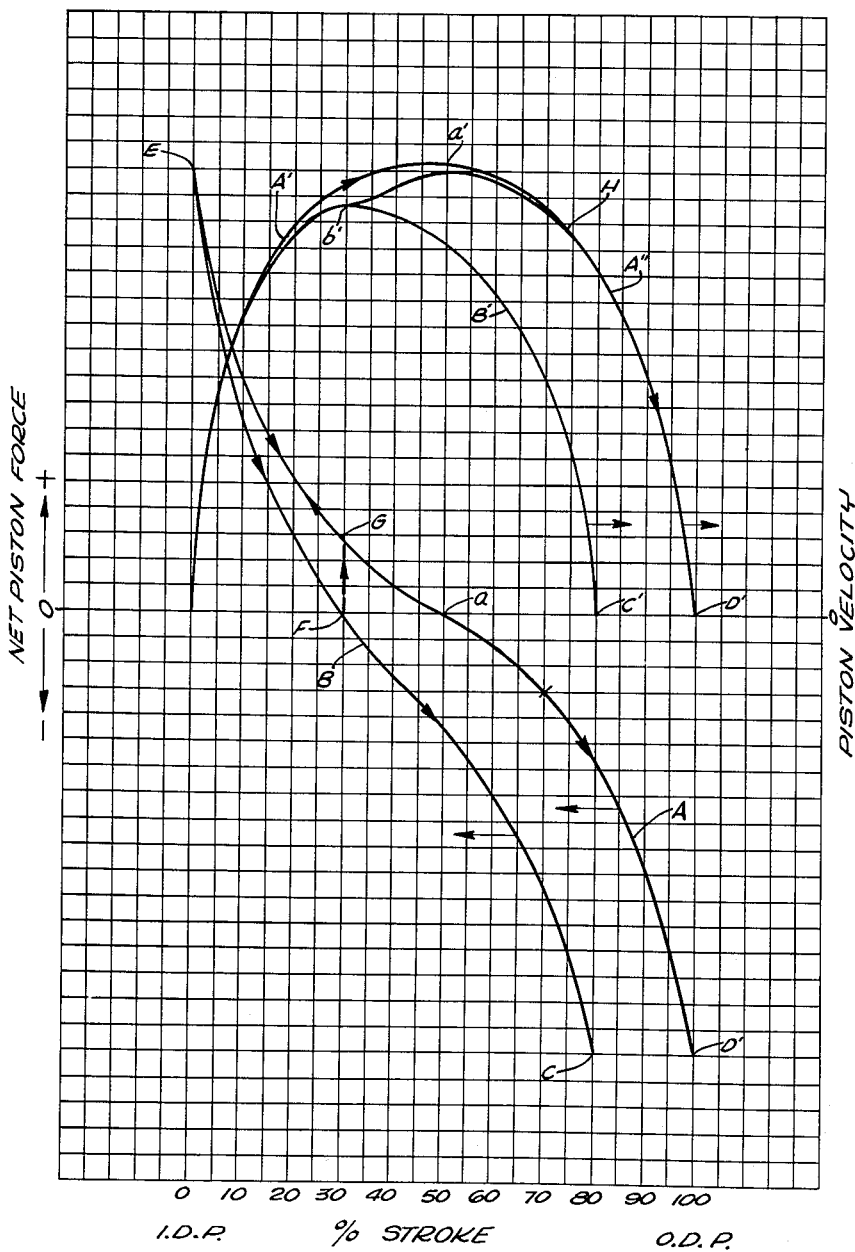
FIG. 17 is a chart illustrating the principles of my invention.

The net force diagram of FIG. 17 is given for purposes of explanation, the values being arbitrary and illustrative only. It will be observed that curve A plots the net force in arbitrary units on the pistons during the outstroke and instroke, with no back pressure in the line 117 and 117'. This is illustrated also in the velocity stroke diagram A'—A", which plots the velocity of the piston during the outstroke, to and fro between I.D.P. and O.D.P., with no back pressure in 117 and 117'. Curve A—A" shows that the maximum velocity at point a' occurs at the zero net force point a, at about 50% of the stroke between I.D.P. and O.D.P. It will be observed that the net force changes in sign at point a.

The creation of a back pressure in the lines 172 and 173, and consequently in the tubes 117 and 117', causes a reduction in the net force during the outstroke, since it opposes the gas pressure in the engine cylinder and the residual pressure in the compressor cylinders. This is illustrated by the curve B. It will be seen that the net force becomes zero at about 30% of the stroke between I.D.P. and O.D.P. The hydraulic back pressure has also reduced the net force at all points of the stroke. This is also shown by the velocity curve B'. The point of maximum velocity $b'$ is now at about 30% of the stroke instead of at 50% of the stroke, as shown at point $a'$ on curve A'. Thus, this or other fluid pressure, if such other fluid is pumped in place of liquid, may be sufficient to reduce the net force to zero before the pistons have picked up sufficient velocity to give them the kinetic energy necessary to complete the outstroke as it did in the case of the curves A and A', where the back pressure of the coil is zero. This is illustrated by the point C' on curve B'. The velocity of the piston at its maximum velocity point $b'$ has stored only sufficient kinetic energy to travel to the C' position on the curve B'. The O.D.P. of the system is thus at point C' on curve B', rather than at the desired position at D' as shown on curve A'.

The stroke is thus so shortened so that the pressure stored in the bounce cylinder is insufficient to return the piston to its I.D.P. of the previous case, which design has chosen as the operating compression pressure in the combustion cylinder. This results in the following outboard stroke to become still shorter and the following inboard stroke to become even more shortened, and the piston reaches a stalling condition which may occur at the first instroke or any following stroke.

It is characteristic of the free-piston engine described above that, for a given level of pressure, the piston cycle frequency is comparatively independent of load; and therefore any stroke reduction materially affects the breathing characteristics, i.e., the operation of the scavenging phase of the cycle. The total area of scavenge ports exposed during the stroke is an exponential function of the stroke, due to the time area integral of the scavenge port opening. Therefore, the total port area opening falls off much more rapidly than the fall of the linear value of the stroke. Thus, the volumetric efficiency of the engine in terms of air intake and air output drops off very rapidly with stroke reduction.

I have solved this problem by reducing the pumped fluid back pressure during the outboard stroke to the O.D.P. when the pistons have reached the region of zero net force, so that the velocity reducing effect of the oil or other fluid back pressures is removed, permitting the engine to complete its excursion to the selected O.D.P. and its return to the selected I.D.P. under substantially no pumped fluid back pressure load.

This is accomplished by the proper positioning of the by-pass selector valve 143, so that the oil, for example is by-passed to a low pressure region at the proper selected design point of the stroke. In employing this solution, I design the engine so that the net gas force, when modified by the maximum delivery liquid or other fluid pressure, is such that the total net force, including the liquid or other fluid back pressure becomes zero at that point in the stroke in which the piston velocity has reached a value sufficient to store the kinetic energy in the piston to complete the stroke as originally designed.

This is illustrated by curve B of FIG. 17, in which the net force is illustrated by the section E—F of curve B is a net force, including the liquid back pressure, for example, the oil back pressure, and shows that net force drops to zero when the piston arrives at point C. The selector valve 149 has been set so that when the pistons have reached this point in their excursion to the O.D.P., the pinion 126 has rotated the selector valve member 158 through the angle required to position ports 154 in communication with the openings 164. The oil is vented through the by-pass 143, thus reducing the liquid back pressure to zero or whatever the desired pressure maintained in the discharge line. This raises the net force to the point G on curve A, which is the curve for zero pressure in 117 and 117'. The back pressure having been relieved, the pistons travel at the velocity established at point $b'$ and are accelerated through the portion of the stroke until it reaches the point H on curve A'. At that point the net force resulting from gas pressures varies along the portion GD of curve A, since this is the condition for no back pressure in 117 and 117'. The piston is now under the balance of forces existing for the system illustrated by curve A. The piston thus moves with a velocity along the curve section $b'$—H until it reaches curve A' at H, and then varies along curve section H—D' of curve A' until it reaches the design O.D.P. at D', when the design bounce pressure will be achieved.

Since on the inboard stroke of the piston the system is under substantially no oil back pressure, the inboard stroke is characterized in force balance by the curve A and its velocity by curve A'.

The fuel pump rack setting selected by the selections of the by-pass port setting is made such that the fuel-air ratio is sufficient to give the combustion chamber pressure required for the conditions described above.

It will be observed that in the above system the relation of the gas pressures at the various portions of the system and the various parts of the stroke must be maintained at a substantially constant value, in order that the variation in the net force with respect to the piston position and piston velocity remain invariant.

In order to be sure that the bounce chamber pressure be sufficient to cause the stroke completion, ports 103 and 103' are provided in the bounce cylinder wall at about that portion of the stroke when it is desired that the net force equals zero. This is, for example, as illustrated in FIG. 17 (see also FIG. 3) about midway in the stroke. The piston clears the port on the inward stroke of the piston and opens the bounce chamber to a constant pressure source 103a. This will control the minimum level of pressure obtained in the bounce chamber to insure that the net force goes to zero at the proper position in the stroke, and thus that the stroke is completed on both the inboard and outboard stroke within the design limits.

This bounce chamber pressure control has a further influence in that it also is a means of controlling the frequency of the piston cycle. This frequency is a function of the piston masses and of the stiffness of the system. The stiffness of the system is a function of the mean levels of pressure in the various cylinders. The higher the level of pressure existing in the bounce cylinder during its cycle, the higher the frequency, provided the fuel-air ratio is also adjusted to compensate for the work done.

While I have described particular embodiments of my invention, it should be understood that various modifications and adaptations thereof may be made within the spirit of the invention, as set forth in the appended claims.

I claim:

1. A free piston engine comprising an engine cylinder section, a pair of free engine piston sections moving reciprocally in said engine cylinder between an inner dead point and an outer dead point, a combustion chamber in said engine cylinder between said free piston sections, compressor cylinders, compressor piston sections connected to said engine piston sections and mounted in said compressor cylinders, bounce cylinders and bounce piston sections in said bounce cylinders, pump cylinders, pump piston sections connected to said engine piston sections, each of said pump cylinders being separate and independent from said bounce cylinders, compressor cylinders and said engine cylinder, means sealing said pump cylinders from said compressor cylinders and said engine cylinder and said bounce cylinders throughout the reciprocation of said engine piston sections, valve means for introducing fluid into said pump cylinders on motion of said engine piston sections from the outer dead point to the inner dead point and to discharge fluid from said pump cylinders exteriorly of said engine on motion of said engine piston sections from the inner dead point to the outer dead point, under a higher pressure than the pressure of said fluid introduced into said pump cylinders, said pump cylinders and pump piston comprising a tubular section positioned in each of said engine pistons and movable therewith, a stationary tube positioned in said tubular section, making a slidable fluid type fit with the wall of said tubular section at one end of said stationary tube, and a fluid outlet from said stationary tube.

2. A free piston engine comprising an engine cylinder section, a pair of free engine piston sections moving reciprocally in said engine cylinder between an inner dead point and an outer dead point, a combustion chamber in said engine cylinder between said free piston sections, compressor cylinders, compressor piston sections connected to said engine piston sections and mounted in said compressor cylinders, bounce cylinders and bounce piston sections in said bounce cylinders, pump cylinders, pump piston sections connected to said engine piston sections, each of said pump cylinders being separate and independent from said bounce cylinders, compressor cylinders and said engine cylinder, means sealing said pump cylinders from said compressor cylinders and said engine cylinder and said bounce cylinders throughout the reciprocation of said engine piston sections, valve means for introducing fluid into said pump cylinders on motion of said engine piston sections from the outer dead point to the inner dead point and to discharge fluid from said pump cylinders exteriorly of said engine on motion of said engine piston sections from the inner dead point to the outer dead point, under a higher pressure than the pressure of said fluid introduced into said pump cylinders, said pump cylinder and pump piston comprising a tubular section positioned in each of said engine pistons and movable therewith, a stationary tube positioned in said tubular section, making a slidable fluid type fit with the wall of said tubular section at one end of said stationary tube, means to introduce and discharge fluid from the pump cylinders, including a fluid inlet and a fluid discharge conduit connected to each of said stationary tubes, a fluid by-pass connection connected to said conduits, a valve in said conduit to control communication between said conduit and said by-pass connection, means operatively connected to said engine pistons to open communication between said conduit and by-pass connection at a pre-determined portion of the stroke of said engine piston from the outer dead point to the inner dead point.

3. In the free piston engine pump of claim 2, means for introducing fuel into said fuel inlet and means for adjusting the amount of fuel introduced in relation to the position of the engine pistons upon establishment of connection between the said by-pass and said conduit.

4. In the free piston engine pump of claim 2, said means connected to said piston to open communication between said conduit and said by-pass connection comprising a rod connected to each of said engine pistons, a rack connected to each of said rods, a spur gear in meshing engagement with said racks, and a shaft for said gear, means connected to said shaft to open said communication between said conduit and said by-pass connection.

5. In the free piston engine pump of claim 4, means for introducing fuel into said fuel inlet and means for adjusting the amount of fuel introduced in relation to the position of the engine pistons upon establishment of connection between the said by-pass and said conduit.

6. In the free piston engine pump of claim 4, means for introducing fuel into said fuel inlet and means connected to said valve member for adjusting the quantity of fuel fed into said engine cylinder.

7. In the free piston engine of claim 4, said valve comprising a valve body for said valve, a valve member, a connection between said valve member and said shaft, an inlet port connected to said valve body and connected to said conduit, a second inlet port connected to said valve body and to said conduit, a by-pass port in said valve body being connected to said by-pass, said connection between said shaft and said valve member moving said valve member to connect said inlet ports during a predetermined portion of the stroke of said engine piston from the inner dead point to the outer dead point, and to close communication between said inlet ports during the remainder of said stroke, and to open communication between said conduit and said by-pass during said remainder, and means to connect said conduit to a fluid source upon the movement of said engine pistons from the outer dead point to the inner dead point.

8. In the free piston engine of claim 4, said valve means comprising a cylindrical valve case, a pair of inlet ports in said valve case, and a by-pass port connected to said case, said ports being spaced angularly about said valve case, a hollow cylinder rotatably positioned in said case, a port in the wall of said hollow cylinder, a second cylindrical member rotatably positioned in said case between said first mentioned hollow cylinder and said case, a port in said wall of said second mentioned cylinder, said shaft connected to said second mentioned cylinder, a second shaft connected to said first mentioned hollow cylinder for angularly positioning said first mentioned hollow cylinder, a passageway in said second hollow cylinder communicating with said first mentioned hollow cylinder and said by-pass port, whereby said first mentioned cylinder may be angularly positioned with respect to said inlet ports and said by-pass ports, said shaft connected to said spur gear, rotating said second mentioned cylinder through an angle during the stroke of said engine pistons and opening communication between said inlet ports and said by-pass port through said ports in said second mentioned and said first mentioned cylinder upon a pre-determined angle of rotation of said shaft.

9. In the free piston engine pump of claim 8, a fuel inlet pump comprising a pump plunger, a pump cylinder for said plunger, fuel passageway from said cylinder to said fuel inlet, a pressure reduction means connected to said pump cylinder, a mechanical connection between said pressure reducing means and said first-mentioned valve cylinder, said pressure reducing means interrupting the flow of fuel from said pump cylinder to said engine, whereby the volume of fuel passed from said fuel pump to said fuel inlet is controlled.

10. A free piston engine comprising an engine cylinder section, a pair of free engine piston sections moving reciprocally in said engine cylinder between an inner dead point and an outer dead point, a combustion chamber in said engine cylinder between said free piston sections, compressor cylinders, compressor piston sections connected to said engine piston sections and mounted in said compressor cylinders, pump cylinders, pump piston sections connected to said engine piston sections, each of said pump cylinders being separate and independent from said compressor cylinders and said engine cylinder, means sealing said pump cylinders from said compressor cylinders and said engine cylinder throughout the reciprocation of said engine piston sections, valve means for introducing fluid into said pump cylinders on motion of said engine piston sections from the outer dead point to the inner dead point and to discharge fluid from said pump cylinders exteriorly of said engine on motion of said engine piston sections from the inner dead point to the outer dead point, under a higher pressure than the pressure of said fluid introduced into said pump cylinders, said valve means to introduce and discharge fluid from said pump cylinders, including a fluid inlet and a fluid discharge conduit connected to each of said pump cylinder chambers, a fluid by-pass connected to said conduit, a valve in said conduit to control communication between said conduit and said by-pass connection, means connected to said piston to open communication between said conduit and said by-pass connection at a pre-determined portion of the stroke of said engine piston from the outer dead point to the inner dead point.

11. In the free piston engine pump of claim 10, means for introducing fuel into said fuel inlet and means for adjusting the amount of fuel introduced in relation to the position of the engine pistons upon establishment of connection between the said by-pass and said conduit.

12. In the free piston engine pump of claim 10, said means connected to said piston to open communication between said conduit and said by-pass connection comprising a rod connected to each of said engine pistons, a rack connected to each of said rods, a spur gear in meshing engagement with said racks, a shaft for said gear, and means connected to said rod to open said communication between said conduit and said by-pass connection.

13. In the free piston engine pump of claim 12, said means for introducing fuel into said fuel inlet including means for adjusting the amount of fuel introduced in relation to the position of the engine pistons upon establishment of connection between the said by-pass and said conduit.

14. In the free piston engine pump of claim 12, said means for introducing fuel into said fuel inlet including means connected to said valve member for adjusting the quantity of fuel into said engine cylinder.

15. In the free piston engine of claim 12, including a valve body for said valve, a valve member, a connection between said valve member and said shaft, an inlet port connected to said valve body and connected to said conduit, a second inlet port connected to said valve body and to said conduit, a by-pass port in said valve body being connected to said by-pass, said connection between said shaft and said valve member moving said valve member to connect said inlet ports during a pre-determined portion of the stroke of said engine pistons from the inner dead point to the outer dead point, and to close communication between said inlet ports during the remainder of said stroke, and to open communication between said conduit and said by-pass during said remainder, and means to connect said conduit to a fluid source upon the movement of said engine pistons from the outer dead point to the inner dead point.

16. In the free piston engine pump of claim 12, said valve means comprising a cylindrical valve case, a pair of inlet ports in said valve case, and a by-pass port connected to said case, said ports being spaced angularly about said valve case, a hollow cylinder rotatably positioned in said case, a second cylindrical member rotatably positioned in said case between said first mentioned hollow cylinder and said case, a port in said wall of said second mentioned cylinder, said shaft connected to said second mentioned cylinder, a second shaft connected to said first mentioned hollow cylinder for angularly positioning said first mentioned hollow cylinder, a passageway in said second hollow cylinder communicating with said first mentioned hollow cylinder and said by-pass port, whereby said first mentioned cylinder may be angularly positioned with respect to said inlet ports and said by-pass ports, said shaft connected to said spur gear rotating said second mentioned cylinder through an angle during the stroke of said engine pistons and opening communication between said inlet ports and said by-pass port through said ports in said second mentioned and said first mentioned cylinder upon a pre-determined angle of rotation of said shaft.

17. In the free piston engine pump of claim 16, a fuel inlet pump comprising a pump plunger, a pump cylinder for said plunger, fuel passageway from said cylinder to said fuel inlet, a pressure reduction means connected to said pump cylinder, a mechanical connection between said pressure reducing means and said first mentioned valve cylinder, said pressure reducing means interrupting the flow of fuel from said pump cylinder to said engine, whereby the volume of fuel passed from said fuel pump to said fuel inlet is controlled.

18. In the free piston engine of claim 10, said pump cylinder and pump piston comprising a tubular section positioned in each of said engine pistons and movable therewith, a stationary tube positioned in said tubular section, making a slidable fluid type fit with the wall of said tubular section at one end of said stationary tube, and a fluid outlet from said stationary tube.

19. In the free piston engine of claim 18, means for introducing fuel into said fuel inlet and means for adjusting the amount of fuel introduced in relation to the position of the piston upon establishment of connection between the said by-pass and said conduit.

References Cited in the file of this patent

UNITED STATES PATENTS

| | | |
|---|---|---|
| 2,075,133 | Pescara | Mar. 30, 1937 |
| 2,178,310 | Pescara | Oct. 31, 1939 |
| 2,189,497 | Pescara | Feb. 6, 1940 |
| 2,230,760 | Pescara | Feb. 4, 1941 |
| 2,387,603 | Neugebauer et al. | Oct. 23, 1945 |
| 2,543,851 | Horgen | Mar. 6, 1951 |
| 2,978,986 | Carder et al. | Apr. 11, 1961 |